United States Patent
Lee et al.

(10) Patent No.: US 9,341,818 B2
(45) Date of Patent: May 17, 2016

(54) PHOTOGRAPHIC LENS AND PHOTOGRAPHIC APPARATUS USING THE SAME

(71) Applicant: SAMSUNG ELECTRONICS CO., LTD., Suwon-si, Gyeonggi-do (KR)

(72) Inventors: Tae-youn Lee, Yongin-si (KR); Yong-wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/058,680

(22) Filed: Oct. 21, 2013

(65) Prior Publication Data
US 2014/0185141 A1    Jul. 3, 2014

(30) Foreign Application Priority Data

Dec. 31, 2012 (KR) .................. 10-2012-0158530

(51) Int. Cl.
*G02B 13/18*    (2006.01)
*G02B 13/00*    (2006.01)
*G02B 9/62*    (2006.01)
*G02B 27/64*    (2006.01)

(52) U.S. Cl.
CPC .............. *G02B 13/0045* (2013.01); *G02B 9/62* (2013.01); *G02B 13/18* (2013.01); *G02B 27/646* (2013.01)

(58) Field of Classification Search
None
See application file for complete search history.

(56) References Cited

U.S. PATENT DOCUMENTS

| 8,035,723 B2 | 10/2011 | Sano et al. |
| 8,325,425 B2 * | 12/2012 | Yoshitsugu .................. 359/687 |
| 2007/0229984 A1 | 10/2007 | Shinohara |
| 2012/0194726 A1 | 8/2012 | Huang et al. |
| 2013/0033762 A1 | 2/2013 | Tsai et al. |
| 2013/0120858 A1 | 5/2013 | Sano |
| 2013/0176469 A1 | 7/2013 | Sano et al. |

FOREIGN PATENT DOCUMENTS

| CN | 202330846 U | 7/2012 |
| JP | 2009-294527 A | 12/2009 |
| JP | 2009-294528 A | 12/2009 |
| JP | 2012-155223 A | 8/2012 |

(Continued)

OTHER PUBLICATIONS

Extended European Search Report issued for EP 13199851.0 (Mar. 25, 2014).

(Continued)

*Primary Examiner* — Derek S Chapel
(74) *Attorney, Agent, or Firm* — Drinker Biddle & Reath LLP

(57) ABSTRACT

A photographic lens and a photographic apparatus including the same are provided. The photographic lens includes a first lens including a convex surface toward an object side and having a positive refractive power, a second lens including a concave surface toward an image side and having a negative refractive power, a third lens having a positive refractive power or a negative refractive power, a fourth lens having a positive refractive power or a negative refractive power, a fifth lens including a convex surface toward the image side and having a positive refractive power, and a sixth lens including a concave aspherical shape with respect to an optical axis toward the image side and having a negative refractive power. The first to sixth lenses may be sequentially arranged from the object side to the image side.

21 Claims, 21 Drawing Sheets

(56) References Cited

FOREIGN PATENT DOCUMENTS

| KR | 10-2007-0097369 A | 10/2007 |
|---|---|---|
| KR | 10-2010-0001525 A | 1/2010 |
| KR | 10-2010-0040357 A | 4/2010 |
| KR | 10-2010-0043667 A | 4/2010 |
| KR | 10-2011-0024872 A | 3/2011 |
| WO | WO 2010/024198 A1 | 3/2010 |
| WO | WO 2012/008357 A1 | 1/2012 |

OTHER PUBLICATIONS

PCT Search Report and Written Opinion issued for PCT/KR2013/012262 (Apr. 4, 2014).

Office Action issued in related application AU 2013371097, Feb. 26, 2016, 3 pages.

* cited by examiner

PHOTOGRAPHIC LENS AND PHOTOGRAPHIC APPARATUS USING THE SAME

CROSS-REFERENCE TO RELATED PATENT APPLICATION

This application claims the priority benefit of Korean Patent Application No. 10-2012-0158530, filed on Dec. 31, 2012, in the Korean Intellectual Property Office, the disclosure of which is incorporated herein in its entirety by reference.

BACKGROUND

1. Field

Various embodiments of the invention relate to a bright photographic lens capable of providing high definition images and a photographic apparatus including the same.

2. Related Art

Photographic apparatuses generally use solid state imaging devices, such as charge-coupled device (CCD) type image sensors and complementary metal-oxide semiconductor (CMOS) type image sensors. Photographic apparatuses include digital still cameras, video cameras, and interchangeable lens cameras. Also, since they have reduced in size, recently, photographic apparatuses using solid state imaging devices are applied to small information terminals such as mobile phones. Users need high performance such as high resolution and wide angles of view. Also, users' expertise with respect to cameras has gradually increased. Also, needs for photographic lenses including bright lenses and capable of providing out focusing performance (i.e., an effect of blurring a background) have increased.

For example, lenses for mobile phone cameras generally use sensors of from ⅕" to ⅓" according to a reduction in prices of sensors and miniaturization, and general sensors for main lenses on the market have sizes of ¼" or ⅓".

When micro sensors are used in optical systems using solid state imaging devices, since a focal length is short, a great depth of field is provided. This is appropriate for taking pictures of scenery but is inappropriate for taking pictures of people.

SUMMARY

Various embodiments of the invention provide a bright photographic lens.

Various embodiments also provide a photographic apparatus including a bright photographic lens.

According to an embodiment, a photographic lens includes: a first lens including a convex surface toward an object side and having a positive refractive power, a second lens including a concave surface toward an image side and having a negative refractive power, a third lens having a positive refractive power or a negative refractive power, a fourth lens having a positive refractive power or a negative refractive power and comprising a convex surface toward the object side, a fifth lens including a convex surface toward the image side and having a positive refractive power, and a sixth lens including a concave aspherical shape with respect to an optical axis toward the image side and having a negative refractive power, in which the first to sixth lenses are sequentially arranged from the object side to the image side.

The photographic lens may satisfy the following equations:

$$0.7 < f/f1 < 1.5;\text{ and}$$

$$0.9 < TL/f < 2.0;$$

in which f indicates a focal length of the photographic lens, f1 indicates a focal length of the first lens, and TL indicates a length between the first lens and an image plane.

The photographic lens may satisfy the following equations:

$$1.6 < Yimg/BF < 3.1;\text{ and}$$

$$Yimg/\text{Tan }\theta > 6.0\text{ mm};$$

in which Yimg indicates a maximum image height in the image plane, BF indicates a length between an image-side surface of the sixth lens and the image plane, and Tan θ indicates a half field of view at the maximum image height.

The photographic lens may satisfy the following equation:

$$0 < Dair34/D25 < 0.15;$$

in which Dair34 indicates a distance between the third lens and the fourth lens, and D25 indicates a distance between the second lens and the fifth lens.

A stop may be provided between the first lens and the second lens.

The photographic lens may satisfy the following equation:

$$vd2 < 30;$$

in which vd2 indicates an Abbe number of the second lens.

The photographic lens may satisfy the following equations:

$$vd1 > 50;\text{ and}$$

$$vd5 > 50;$$

in which vd1 indicates an Abbe number of the first lens, and vd5 indicates an Abbe number of the fifth lens.

The photographic lens may satisfy the following equation:

$$1.58 < N2 < 1.68;$$

in which N2 indicates a refractive index of the second lens with respect to d-line.

The photographic lens may satisfy the following equations:

$$1.51 < N5 < 1.56;\text{ and}$$

$$1.51 < N6 < 1.56;$$

in which N5 indicates a refractive index of the fifth lens with respect to the d-line, and N6 indicates a refractive index of the sixth lens with respect to the d-line.

The sixth lens may include one or more inflection points on an image-side surface.

The sixth lens may satisfy the following equation:

$$1.0 < |f/f6| < 4.0;$$

in which f indicates a focal length of the photographic lens, and f6 indicates a focal length of the sixth lens.

The first lens may be formed of plastic or glass.

The second to sixth lenses may be formed of plastic.

One of the first to sixth lenses may be a negative lens having an Abbe number of 30 or less.

Optical image stabilization (OIS) may be performed by using all first to sixth lenses.

The third lens and the fourth lens may have smaller refractive powers than the first lens, the second lens, the fifth lens, and the sixth lens.

The sixth lens may include one or more inflection points on an object-side surface.

The object-side surface of the sixth lens may have a concave shape with respect to the optical axis.

The photographic lens may have an F number within a range of about 1.6 to about 1.8.

Both sides of the third lens may be spherical.

The first lens may include a convex surface toward the image side.

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
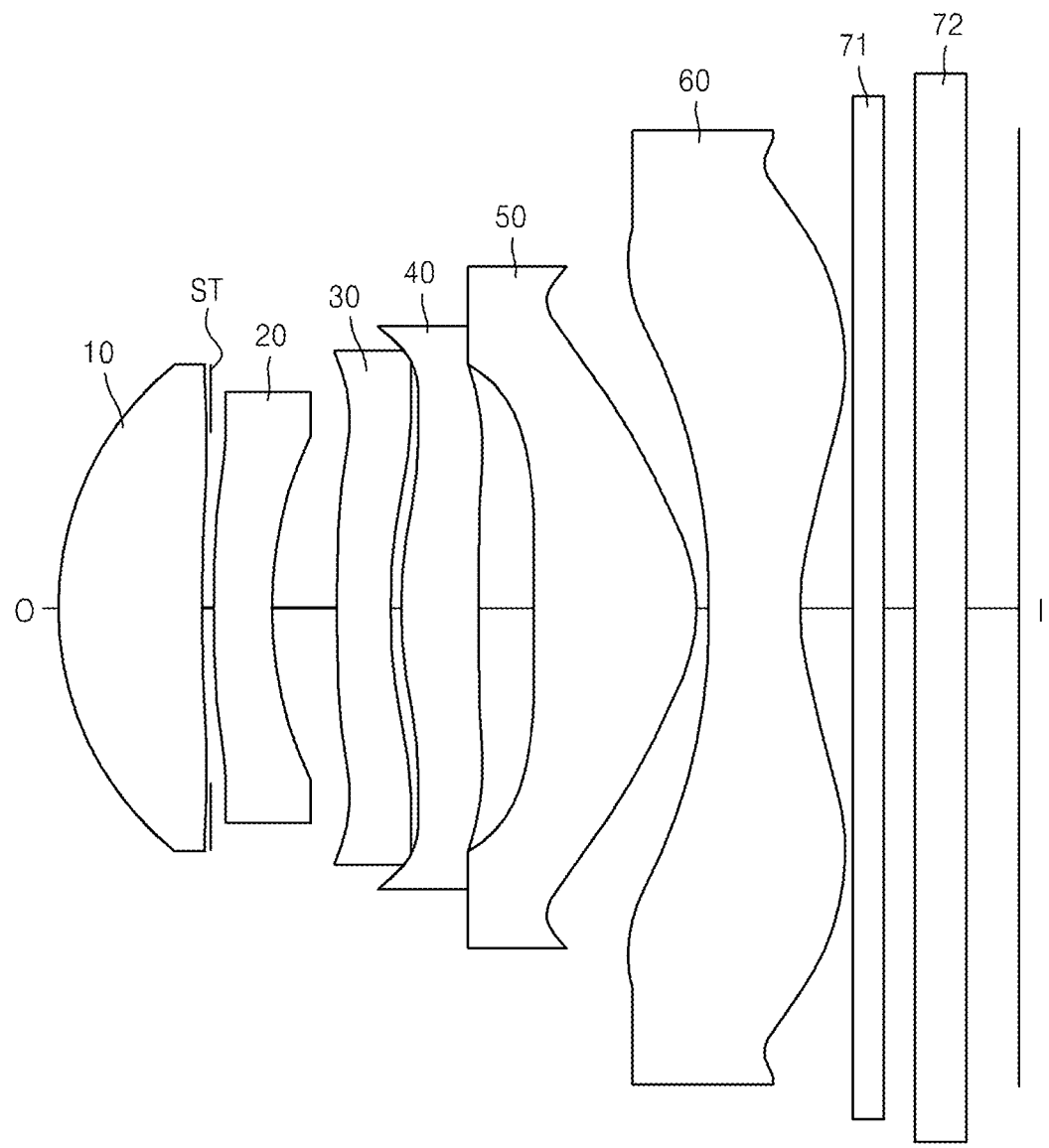
FIG. 1 is a diagram illustrating a photographic lens, according to an embodiment.

Hereinafter, photographic lenses and photographic apparatuses including the photographic lenses according to exemplary embodiments will be described in detail with reference to the drawings.

FIGS. 1, 4, 7, 10, 13, 16, and 19 are diagrams illustrating a photographic lens, according to the exemplary embodiments.

Lenses of the photographic lens are sequentially arranged from an object side O to an image side I. The photographic lens includes a first lens 10 having a positive refractive power, a second lens 20 having a negative refractive power, a third lens 30 having one of a positive refractive power and a negative refractive power, a fourth lens 40 having one of a positive refractive power and a negative refractive power, a fifth lens 50 having a positive refractive power, and a sixth lens 60 having a negative refractive power. A stop ST may be arranged between the first lens 10 and the second lens 20. Also, the stop ST may be arranged on an image-side I of the first lens 10.

The first lens 10 may have a convex surface toward the object side O, and the second lens 20 may have a concave surface toward the image side I. The third lens 30 may have one of a convex surface and a concave surface toward the object side O. The fourth lens 40 may have a convex surface toward the object side O. The fifth lens 50 may have a convex surface toward the image side I. The sixth lens 60 may have an aspherical shape concave toward the image side I with respect to an optical axis.

The photographic lens according to the present embodiment has F numbers within a range of about 1.6 to about 1.8 and may be applied to photographic apparatuses including large image sensors. The large image sensors, for example, may have a size of $1/1.7"$. However, the size of the large image sensors is not limited thereto. The photographic apparatus according to the present embodiment may be applied to photographic apparatuses such as mobile phones, cameras, digital still cameras, micro pocket camcorders, etc. When a photographic apparatus includes a large image sensor and bright lenses, an aberration may increase and sensitivity may increase.

In the present embodiment, the third lens 30 and the fourth lens 40 may have refractive powers that are smaller than the refractive powers of other lenses, thereby decrease sensitivity, which increases due to the increase of the number of lenses. The first lens 10 may have an Abbe number of 50 or more, and the second lens 20 may have an Abbe number of about 20 to about 30. Accordingly, the increase of a longitudinal chromatic aberration as a focal length increases may be effectively corrected.

One or more of the third lens 30 and the fourth lens 40 may be an aspherical lens. Aberration correction is allocated to the third lens 30 and the fourth lens 40, respectively, thereby efficiently controlling an aberration that occurs due to a large image sensor and bright lenses.

The first lens 10 may be formed of one of a plastic lens and a glass lens. The first lens 10, for example, may be formed of aspherical glass. Also, the first lens 10, for example, may have a refractive index within a range of about 1.53 to about 1.54, thereby reducing a coma-aberration. An object-side surface of the first lens 10 may be convex and an image-side I of the first lens 10 may be concave. The image-side surface of the first lens 10 may have a greater radius of curvature than the object-side surface of the first lens 10, thereby reducing a comatic flare caused by the increase of a coma aberration due to being decentered.

As shown in FIG. 1, the stop ST may be provided on the image-side of the first lens 10. When an F number is small, a nonaxial aberration greatly increases. The stop ST is located on the image-side of the first lens 10, thereby decreasing an incident angle of an upper ray and lowering a ray height from the second lens 20 to the sixth lens 60 after the stop ST such that a nonaxial aberration from F1.6 to F1.8 may be easily controlled and lens sensitivity may be reduced.

The fifth lens 50 may have telecentric properties by having the convex surface toward the image side I. The sixth lens 60 may have a concave surface toward the object side O and may have the concave surface toward the image side I with respect to the optical axis. An image-side of the sixth lens 60 may have one or more inflection points. The inflection point indicates a point where a sign of a refractive power is changed from positive (+) to negative (−) or changed from negative (−) to positive (+). The image-side of the sixth lens 60 may have a concave shape adjacent to the optical axis and may have a convex shape and a concave shape farther out from the optical axis. Since the sixth lens 60 has the one or more inflexion points, astigmatic field curves occurring from the first to fifth lenses 10 to 50 may be corrected, and an angle being incident on an image sensor (i.e., an angle that a chief ray is incident on an image plane, which is designated as a chief ray angle) may be controlled. Also, the increase of an axial spherical aberration while using bright lenses and an axial coma-aberration may be effectively corrected.

On the other hand, increase of the number of lenses when using a large image sensor may cause increase of sensitivity. The refractive powers of the third lens 30 and the fourth lens 40 may be smaller than the first, second, fifth, and sixth lenses 10, 20, 50, and 60, thereby reducing sensitivity of the photographic lens.

In the present embodiment, it is possible to perform focusing by moving the entire first to sixth lenses 10 to 60. Also, optical image stabilization (OIS) may be performed by moving the entire first to sixth lenses 10 to 60. The photographic lens includes six lenses, and one or more of the third lens 30 and the fourth lens 40 is formed of an aspherical lens, thereby designed to be appropriate for large image sensors and bright lenses. Also, it is possible to take pictures with high definition and to provide out focusing (i.e., an effect of blurring a background) performance.

The photographic lens according to the present embodiment may satisfy following equations $$0.7 < f/f1 < 1.5 \qquad \text{Equation (1)}$$

$$0.9 < TL/f < 2.0 \qquad \text{Equation (2)}$$

in which, f indicates a focal length of the photographic lens, f1 indicates a focal length of the first lens 10, TL indicates a length from the first lens 10 to the image plane or the image sensor.

In Equation 1, (f/f1) limits the refractive power of the first lens 10. When (f/f1) has a value of the lower limit or less, the refractive power of the first lens 10 becomes smaller, thereby increasing a longitudinal chromatic aberration of the entire photographic lens. When (f/f1) has a value of the upper limit or more, since the refractive power becomes too great and a spherical aberration increases, it is difficult to correct the aberration.

In Equation 2, when (TL/f) is equal to or greater than the upper limit, axial or nonaxial aberrations may be corrected, but it is difficult to minimize the size of the photographic lens due to increase of a full optical length. When (TL/f) is equal to or less than the lower limit, miniaturization is easy. However, it is difficult to produce the lenses by injection molding, because thicknesses of the lenses become smaller and productivity decreases due to increase of sensitivity.

The photographic lens according to the present embodiment may satisfy following equations $$1.6 < Yimg/BF < 3.1 \qquad \text{Equation (3)}$$

$$Yimg/\tan \theta > 6.0 \text{ mm} \qquad \text{Equation (4)}$$

in which Yimg indicates a maximum image height on the image field, BF indicates a back focal length, which is the focal length from the image-side of the sixth lens 60 to the image field, and Tan θ indicates a half field of view at the maximum image height.

In Equation 3, when (Yimg/BF) is equal to or lower than the lower limit, a total length of the photographic lens may increase, and it may be difficult to correct aberrations. When (Yimg/BF) is equal to or greater than the upper limit, there may not be enough space for installing a device such as an IR filter.

In Equation 4, (Yimg/Tan θ) indicates a ratio of the maximum image height to the half field of view. When Equation 4 is satisfied, it is possible to generate high definition images by using a large image sensor. The image sensor, for example, may have a size of 1/1.7". The large image sensor is used, thereby performing functions like out focusing, which is an effect of blurring a background.

The photographic lens may satisfy the following equation $$0 < Dair34/D25 < 0.15 \qquad \text{Equation (5)}$$

in which Dair34 indicates a distance between the third lens 30 and the fourth lens 40, and D25 indicates a distance between the second lens 20 and the fifth lens 50. That is, D25 indicates a distance between an image side surface of the second lens 20 and an object side surface of the fifth lens 50.

Equation 5 shows a ratio of the distance between the third lens 30 and the fourth lens 40 to the distance between the second lens 20 and the fifth lens 50. The distance between the second lens 20 and the fifth lens 50 includes thicknesses of the third lens 30 and the fourth lens 40. When Equation 5 is satisfied, it is possible to provide an appropriate space for arranging a device for installing the stop ST located between the first lens 10 and the second lens 20 and to provide a space for inserting a mask, which is a film to prevent a flare and a ghost in respective lenses. When (Dair34/D25) has a value of the lower limit or less, since the distance between the third lens 30 and the fourth lens 40 is short, there is a lack of the space for inserting the mask. When (Dair34/D25) has a value of the upper limit or more, due to increase of the total length of the photographic lens, it is difficult to minimize the size of the photographic lens. Also, an irregular thickness ratio of the third lens 30 to the fourth lens 40 increases, thereby deteriorating efficiency of injection-molding of the lenses. The irregular thickness ratio indicates a thickness ratio of an edge portion of a lens to a center portion thereof. When the irregular thickness ratio increases, a central thickness is excessively thin or an edge thickness is excessively thick in such a way that molding properties of injected lenses may be deteriorated. When Equation 5 is satisfied, a ray exiting from the second lens 20, which has a negative refractive power, reduces an incident angle of a ray incident on the fifth lens 50, which has a positive refractive power.

Also, to correct aberration caused by using a large image sensor, aspherical shapes of the third lens 30 and the fourth lens 40 may be appropriately controlled. Because the third lens 30 and the fourth lens 40 together have four lens surfaces, an aspherical surface may be appropriately used, thereby effectively correcting the increase in aspherical aberrations and coma-aberrations due to brightness of lenses. On the other hand, the stop ST may be provided between the first lens 10 and the second lens 20. When the stop ST is located between the first lens 10 and the second lens 20 instead of being located on the object-side of the first lens 10, an incident angle of an upper ray incident on the object-side surface of the first lens 10 is reduced, thereby decreasing sensitivity of the first lens 10, and an upper ray of the lens disposed after the stop ST may lower a height of a progressive ray. The sensitivity may increase because an amount of luminous flux has much more effect as a height of a ray becomes greater. Accordingly, the sensitivity may be reduced by lowering the height of the ray.

The photographic lens may satisfy the following equation $$vd2 < 30 \quad \text{Equation (6)}$$

in which vd2 indicates an Abbe number of the second lens 20.

Equation 6 relates to correcting a chromatic aberration. Materials of lenses may be classified according to Abbe numbers into a crown group having an Abbe number of 50 or more and a flint group having an Abbe number less than 50. The second lens 20 having the negative refractive power may effectively correct a longitudinal chromatic aberration by using high-dispersion material of the flint group.

The first lens 10 and the fifth lens 50 may satisfy following equations $$vd1 > 50 \quad \text{Equation (7)}$$

$$vd5 > 50 \quad \text{Equation (8)}$$

in which vd1 indicates an Abbe number of the first lens 10 and vd5 indicates an Abbe number of the fifth lens 50.

The first lens 10 having the positive refractive power may use a low-dispersion material of a crown group. When being formed of aspherical glass, the first lens 10 may use a material with higher dispersion than plastic, thereby more effectively correcting a longitudinal chromatic aberration. For example, the first lens 10 may be formed of a material having an Abbe number of 50 or more, and the second lens 20 may be formed of a material having an Abbe number of 30 or less. Also, a difference of 20 or more exists between the Abbe numbers of the first lens 10 and the second lens 20, thereby reducing chromatic flares that deteriorate a contrast. The fifth lens 50 is formed of a material having an Abbe number of 50 or more, thereby easily correcting chromatic aberrations.

The photographic lens may satisfy the following equation $$1.58 < N2 < 1.68 \quad \text{Equation (9)}$$

in which N2 indicates a refractive index of the second lens 20 with respect to d-line.

The photographic lens may satisfy following equations $$1.51 < N5 < 1.56 \quad \text{Equation (10)}$$

$$1.51 < N6 < 1.56 \quad \text{Equation (11)}$$

in which N5 indicates a refractive index of the fifth lens 50 with respect to the d-line, and N6 indicates a refractive index of the sixth lens 60 with respect to the d-line.

When Equations 9 to 11 are satisfied, it is possible to decrease manufacturing costs of lenses, to lighten the weight of the lenses, and to easily process the lenses. Also, since sizes of the lenses increase when used with the large image sensor, the sixth lens 60 having a complicated shape may be formed of plastic having less double refraction (i.e., less birefringence).

The sixth lens may satisfy the following equation $$1.0 < |f/f6| < 4.0 \quad \text{Equation (12)}$$

in which f indicates a focal length of the photographic lens and f6 indicates a focal length of the sixth lens 60.

Equation 12 relates to the focal length of the sixth lens 60, and the sixth lens 60 may correct astigmatic field curves, exit angles, and distortions occurring in the first to fifth lenses 10 to 50. When |f/f6| is out of the range in Equation 12, it becomes difficult to correct astigmatic field curves.

A negative lens having an Abbe number of 30 or less may form only one of the first to sixth lenses 60. That is, the photographic lens uses only one negative lens with high dispersion, thereby shortening the total length and appropriately correcting aberrations, such as longitudinal chromatic aberrations that are chromatic aberrations on an axis and chromatic aberrations of magnification, to have high image forming performance at angles from the center to peripheral views.

The photographic lens may perform OIS by using the whole first to sixth lenses.

Furthermore, an aspherical surface used in the photographic lens according to the present embodiment will be defined as follows.

An aspherical shape may be shown as the following equation (Equation 13) in which a heading direction of a ray is positive when an optical axis is an x-axis and a direction vertical to the optical axis is a y-axis. In this case, x indicates a length from an apex in a direction of the optical axis, y indicates a length in a direction vertical to the optical axis, K indicates a conic constant, a, b, c, and d indicate aspherical coefficients, and C indicates a reciprocal number of a radius curvature (1/R) at the apex of the lens.

$$x = \frac{Cy^2}{1 + \sqrt{1 - (K+1)C^2 y^2}} + ay^4 + by^6 + cy^8 + dy^{10} \quad \text{Equation (13)}$$

In the present disclosure, various designs of the photographic lens are shown according to the following embodiments. Hereinafter, focal lengths are shown using mm, angles of view are shown using degrees, and * indicates an aspherical surface. Also, with respect to wavelengths, C-line is 656.3 nm, d-line is 587.6 nm, e-line is 546.1 nm, g-line is 435.8 nm, and F-line is 486.1 nm.

In the drawings illustrating the respective embodiments, one or more filters 71 and 72 may be provided most adjacent to the image side I. The filters 71 and 72, for example, may include one or more of a low pass filter, an IR cut-off filter, and a cover glass. However, it is possible to form the photographic lens with no filter.

<Embodiment 1>

FIG. 1 is a diagram illustrating a photographic lens, according to an embodiment. Design data of Embodiment 1 is shown as follows.

Hereinafter, the degree of an opposite angle on an image plane, that is, a maximum image height is all the same as Y=4.9 mm.

In Embodiment 1, first to sixth lenses 10 to 60 have P-N-N-P-P-N type refractive powers and a stop ST is arranged between the first and second lenses 10 and 20. In this case, P indicates a positive refractive power and N indicates a negative refractive power. An F number is F/1.88, a half angle of view is 32.59°, a full length (TL) is 9.59 mm, and an entire focal length (f) is 7.55 mm.

TABLE 1

| Lens surface | Radius Curvature | Thickness | Refractive index (nd) | Abbe number (vd) |
|---|---|---|---|---|
| Obj | infinity | infinity | | |
| S1 | infinity | 0.000 | | |
| S2* | 3.329 | 1.420 | 1.544 | 56.11 |
| S3* | −257.684 | 0.054 | | |
| S4(ST) | infinity | 0.054 | | |
| S5* | 7.150 | 0.600 | 1.651 | 21.54 |
| S6* | 3.183 | 0.632 | | |
| S7* | 6.753 | 0.550 | 1.544 | 56.11 |
| S8* | 5.146 | 0.144 | | |
| S9* | 6.375 | 0.746 | 1.544 | 56.11 |
| S10* | 15.638 | 0.592 | | |
| S11* | −16.478 | 1.600 | 1.531 | 55.75 |
| S12* | −1.599 | 0.127 | | |
| S13* | −8.632 | 0.900 | 1.544 | 56.11 |
| S14* | 1.909 | 0.540 | | |
| S15 | infinity | 0.300 | 1.517 | 64.20 |
| S16 | infinity | 0.300 | | |
| S17 | infinity | 0.5 | 1.517 | 64.20 |
| S18 | infinity | 0.518 | | |
| Img | infinity | 0.01 | | |

*indicates an aspherical surface, img indicates an image plane or an image sensor, and conic constants (K) and values of aspherical coefficients A, B, C, D, E, and F are as follows. Also, S1 surface may be dummy surface.

TABLE 2

| Lens surface | K | A | B | C | D | E | F |
|---|---|---|---|---|---|---|---|
| S2 | 0.0000E+00 | 7.8628E−04 | 2.8790E−05 | 4.4982E−05 | 1.3676E−06 | | |
| S3 | 0.0000E+00 | −3.6876E−03 | 4.2240E−03 | −1.0098E−03 | 7.2356E−05 | | |
| S5 | 0.0000E+00 | −2.1007E−02 | 8.1243E−03 | −1.8756E−03 | 1.3736E−04 | | |
| S6 | 0.0000E+00 | −2.1613E−02 | 5.4947E−03 | −1.0900E−03 | 9.0234E−05 | | |
| S7 | 0.0000E+00 | −8.5226E−03 | −5.7846E−04 | 1.5515E−05 | 0.0000E+00 | | |
| S8 | 0.0000E+00 | −1.0873E−02 | −8.5762E−04 | 4.1969E−04 | −1.1431E−04 | 9.4499E−06 | |
| S9 | 0.0000E+00 | −1.2824E−02 | 2.6316E−04 | 1.9175E−04 | −3.2604E−05 | | |
| S10 | 0.0000E+00 | −9.1650E−03 | −3.1691E−05 | 0.0000E+00 | 0.0000E+00 | | |
| S11 | 0.0000E+00 | −5.5748E−03 | 2.8647E−04 | −5.9798E−04 | 1.2032E−04 | −1.3160E−05 | |
| S12 | −4.8627E+00 | −1.2993E−02 | 2.1348E−03 | −3.5270E−04 | 3.2928E−05 | −8.3881E−07 | |
| S13 | −1.5815E+02 | −1.5226E−02 | 8.9540E−04 | 3.4438E−05 | −3.3116E−06 | 5.9035E−08 | |
| S14 | −8.1401E+00 | −1.0316E−02 | 1.0846E−03 | −1.0864E−04 | 6.2976E−06 | −2.1372E−07 | 3.5743E−09 |

Figure 2:
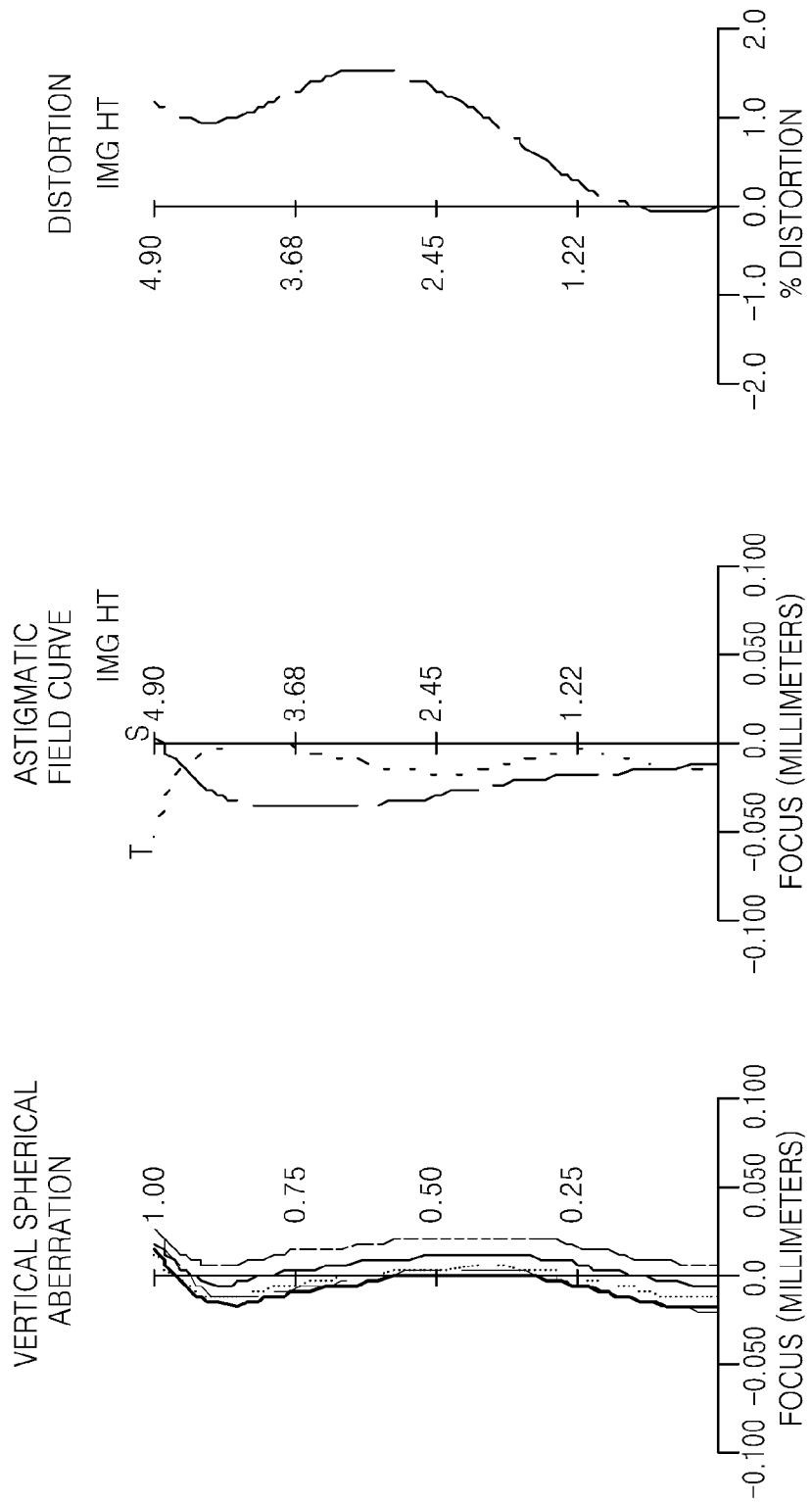
FIG. 2 is a diagram illustrating longitudinal aberrations, astigmatic field curves, and distortions of the photographic lens of FIG. 1.
Figure 3:
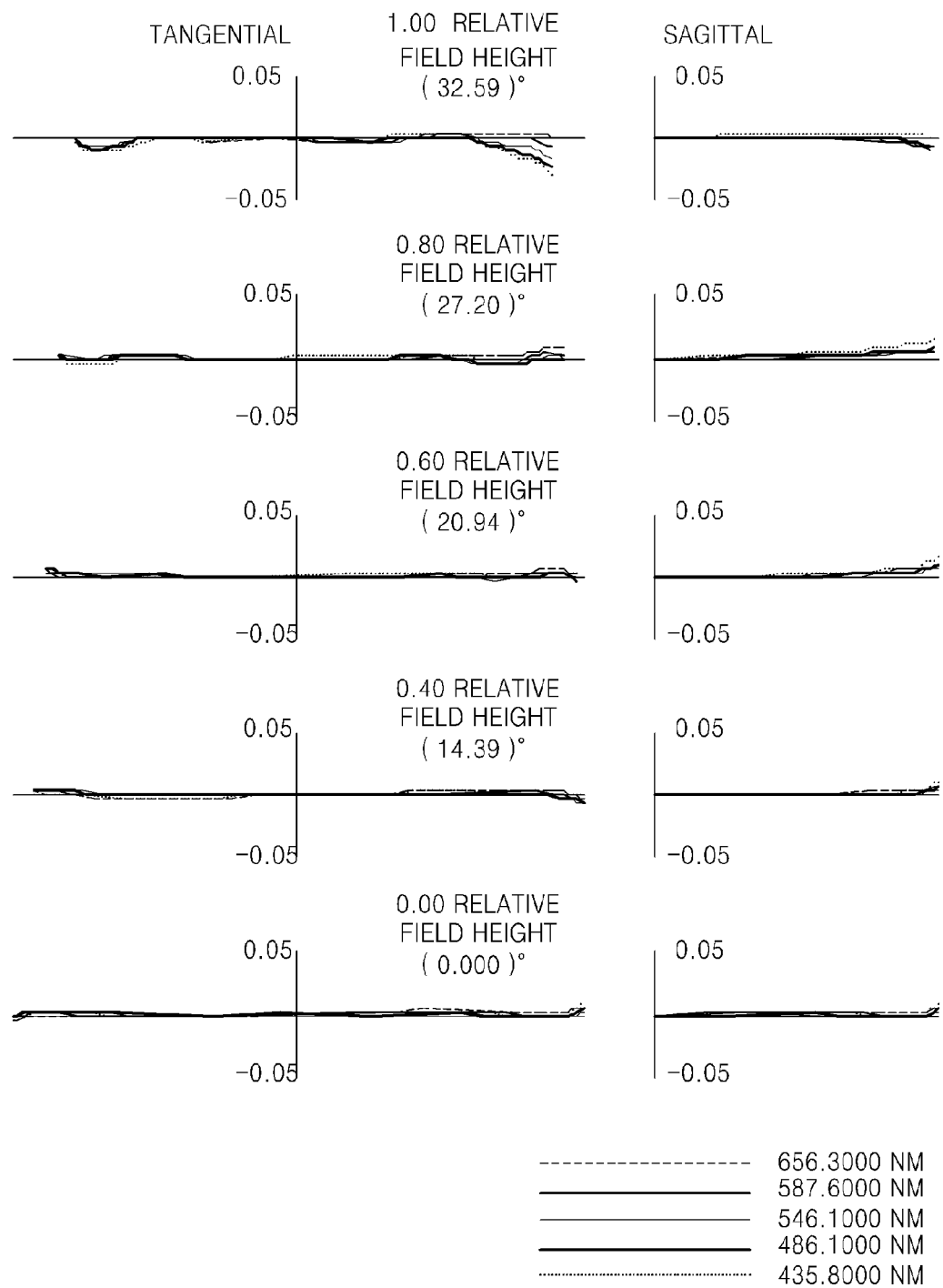
FIG. 3 is a diagram illustrating coma-aberration of the photographic lens of FIG. 1.

FIG. 2 illustrates longitudinal spherical aberrations, astigmatic field curves, and distortions of the photographic lens of FIG. 1. As the astigmatic field curves, tangential field curvatures (T) and sagittal field curvatures (S) are shown. FIG. 3 is a coma-aberration diagram of the photographic lens of FIG. 1.

<Embodiment 2>

Figure 4:
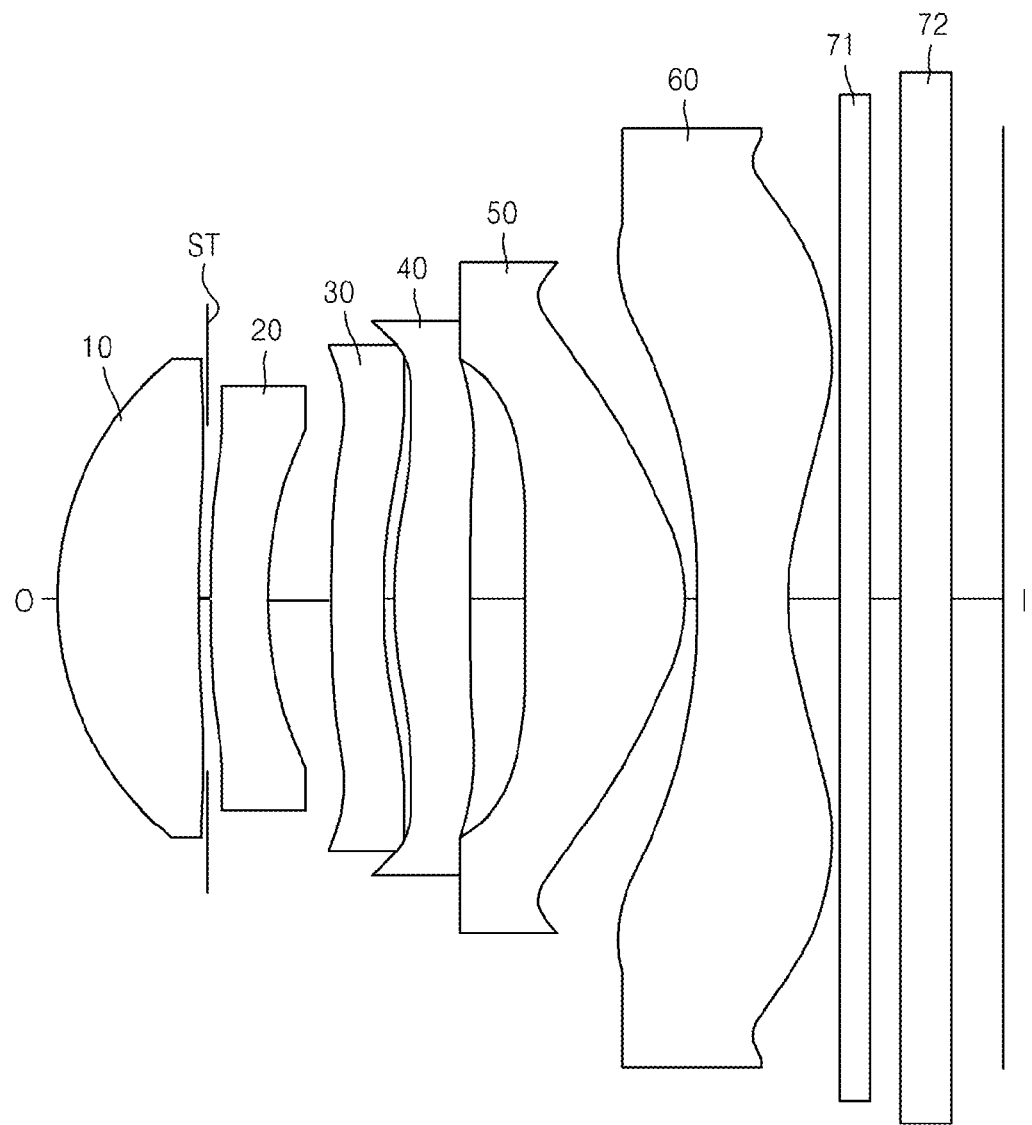
FIG. 4 is a diagram illustrating a photographic lens, according to another embodiment.

FIG. 4 is a diagram illustrating a photographic lens, according to another embodiment. Design data of Embodiment 2 is shown as follows.

In Embodiment 2, first to sixth lenses 10 to 60 have P-N-P-P-P-N type refractive powers and a stop ST is arranged on an image-side of the first lens 10. The third lens 30 may have both spherical surfaces. An F number is F/1.86, a half angle of view is 32.66°, a total length (TL) is 9.60 mm, and an entire focal length (f) is 7.55 mm.

TABLE 3

| Lens surface | Radius Curvature | Thickness | Refractive index (nd) | Abbe number (vd) |
|---|---|---|---|---|
| obj | infinity | infinity | | |
| S1* | 3.250 | 1.472 | 1.544 | 56.11 |
| S2*(ST) | 1571.375 | 0.173 | | |
| S3* | 7.284 | 0.580 | 1.651 | 21.54 |
| S4* | 3.311 | 0.543 | | |
| S5 | −26.067 | 0.550 | 1.531 | 55.75 |
| S6 | −17.286 | 0.040 | | |
| S7* | 10.276 | 0.657 | 1.531 | 55.75 |
| S8* | 17.456 | 0.727 | | |
| S9* | −8.081 | 1.600 | 1.531 | 55.75 |
| S10* | −1.442 | 0.077 | | |
| S11* | −8.204 | 0.949 | 1.531 | 55.75 |
| S12* | 1.757 | 0.600 | | |
| S13 | infinity | 0.300 | 1.517 | 64.2 |
| S14 | infinity | 0.3 | | |
| S15 | infinity | 0.5 | 1.517 | 64.2 |
| S16 | infinity | 0.52 | | |
| img | infinity | 0.01 | | |

Conic constants (K) and aspherical coefficients (A, B, C, D, E, and F) are shown as follows.

TABLE 4

| Lens surface | K | A | B | C | D | E | F |
|---|---|---|---|---|---|---|---|
| S1 | 0.0000E+00 | 5.8742E−04 | 1.8688E−04 | 4.2207E−06 | 6.7137E−06 | | |
| S2 | 0.0000E+00 | −7.6978E−03 | 6.0522E−03 | −1.4329E−03 | 1.1431E−04 | | |
| S3 | 0.0000E+00 | −2.9707E−02 | 1.2506E−02 | −3.0447E−03 | 2.5684E−04 | | |
| S4 | 0.0000E+00 | −2.6824E−02 | 9.2188E−03 | −2.0903E−03 | 2.0186E−04 | | |
| S7 | 0.0000E+00 | −1.2424E−02 | 6.9320E−05 | 1.6027E−04 | −2.6072E−05 | | |
| S8 | 0.0000E+00 | −9.1650E−03 | −3.1691E−05 | 0.0000E+00 | 0.0000E+00 | | |
| S9 | 0.0000E+00 | −6.0947E−03 | 4.3039E−04 | −6.4450E−04 | 1.1453E−04 | −9.7778E−06 | |
| S10 | −4.5780E+00 | −1.8280E−02 | 3.0519E−03 | −5.1179E−04 | 3.5815E−05 | 2.0824E−07 | |

TABLE 4-continued

| Lens surface | K | A | B | C | D | E | F |
|---|---|---|---|---|---|---|---|
| S11 | −2.0569E+02 | −1.3414E−02 | 7.5877E−04 | 2.3031E−05 | −1.6249E−06 | 6.4337E−09 | |
| S12 | −7.9521E+00 | −9.7786E−03 | 1.0701E−03 | −1.0836E−04 | 6.4484E−06 | −2.2542E−07 | 3.7468E−09 |

Figure 5:
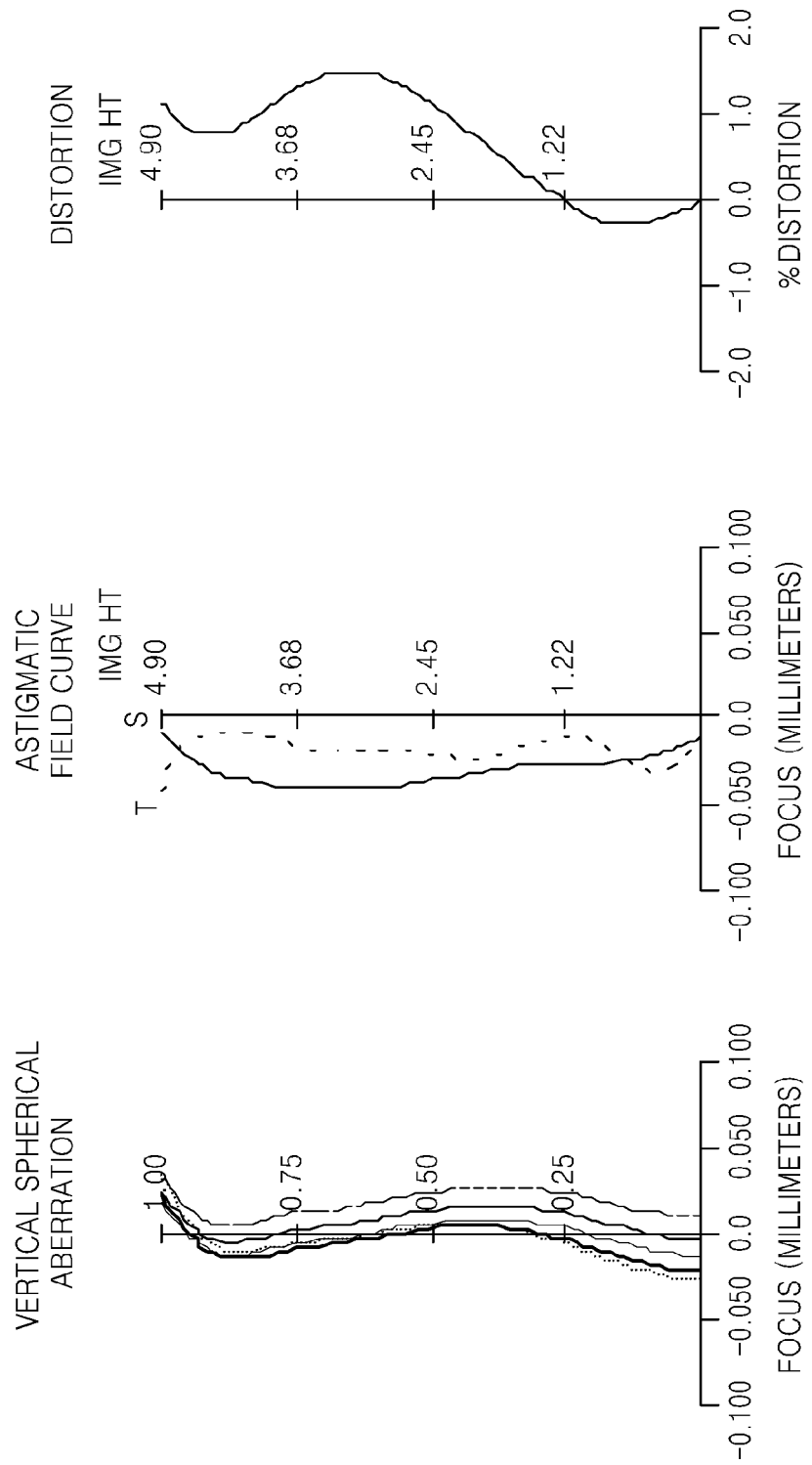
FIG. 5 is a diagram illustrating longitudinal aberrations, astigmatic field curves, and distortions of the photographic lens of FIG. 4.
Figure 6:
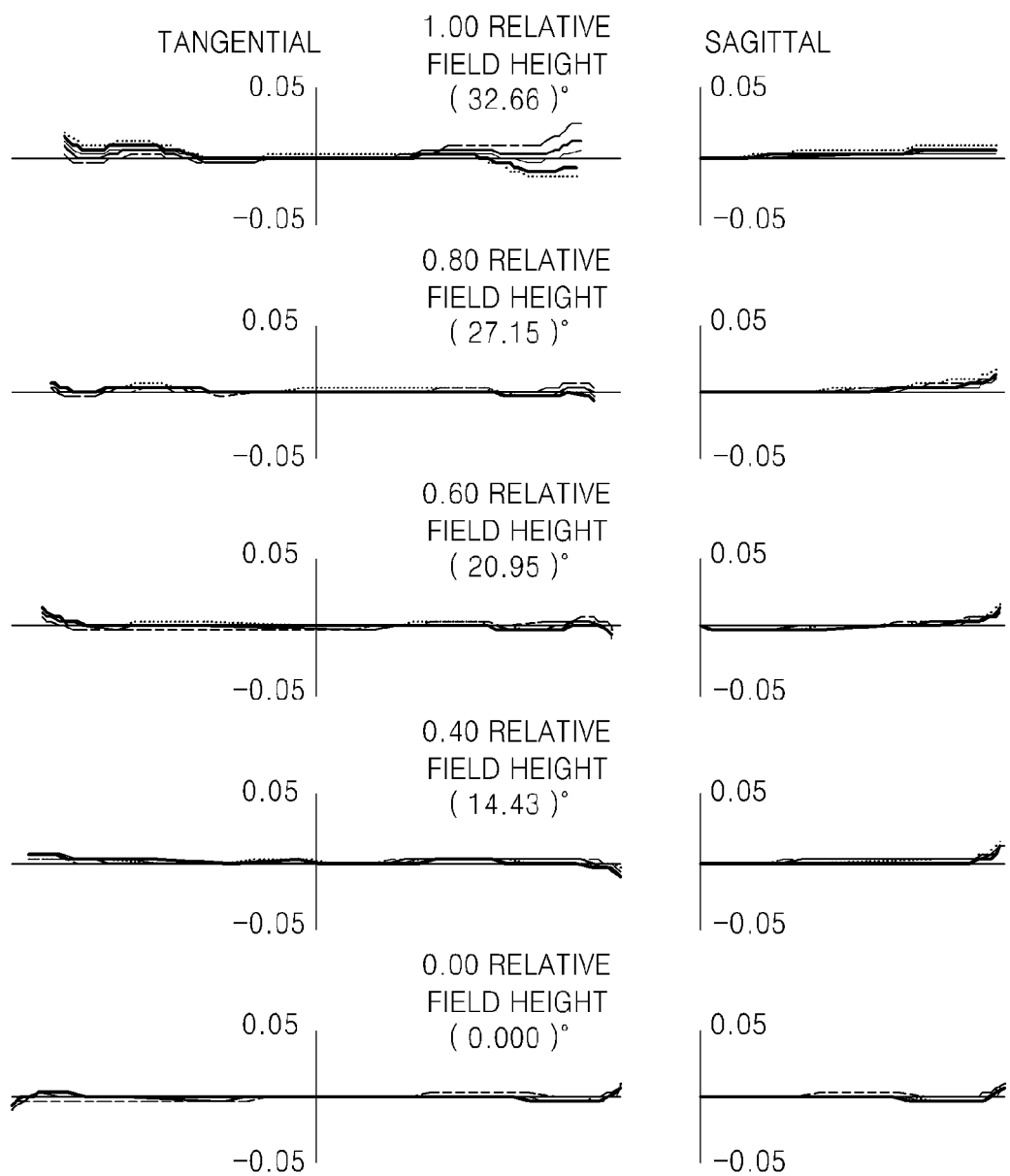
FIG. 6 is a diagram illustrating coma-aberration of the photographic lens of FIG. 4.

FIG. 5 illustrates longitudinal spherical aberrations, astigmatic field curves, and distortions of the photographic lens of FIG. 4. As the astigmatic field curves, tangential field curvatures (T) and sagittal field curvatures (S) are shown. FIG. 6 is a coma-aberration diagram of the photographic lens of FIG. 4.

<Embodiment 3>

Figure 7:
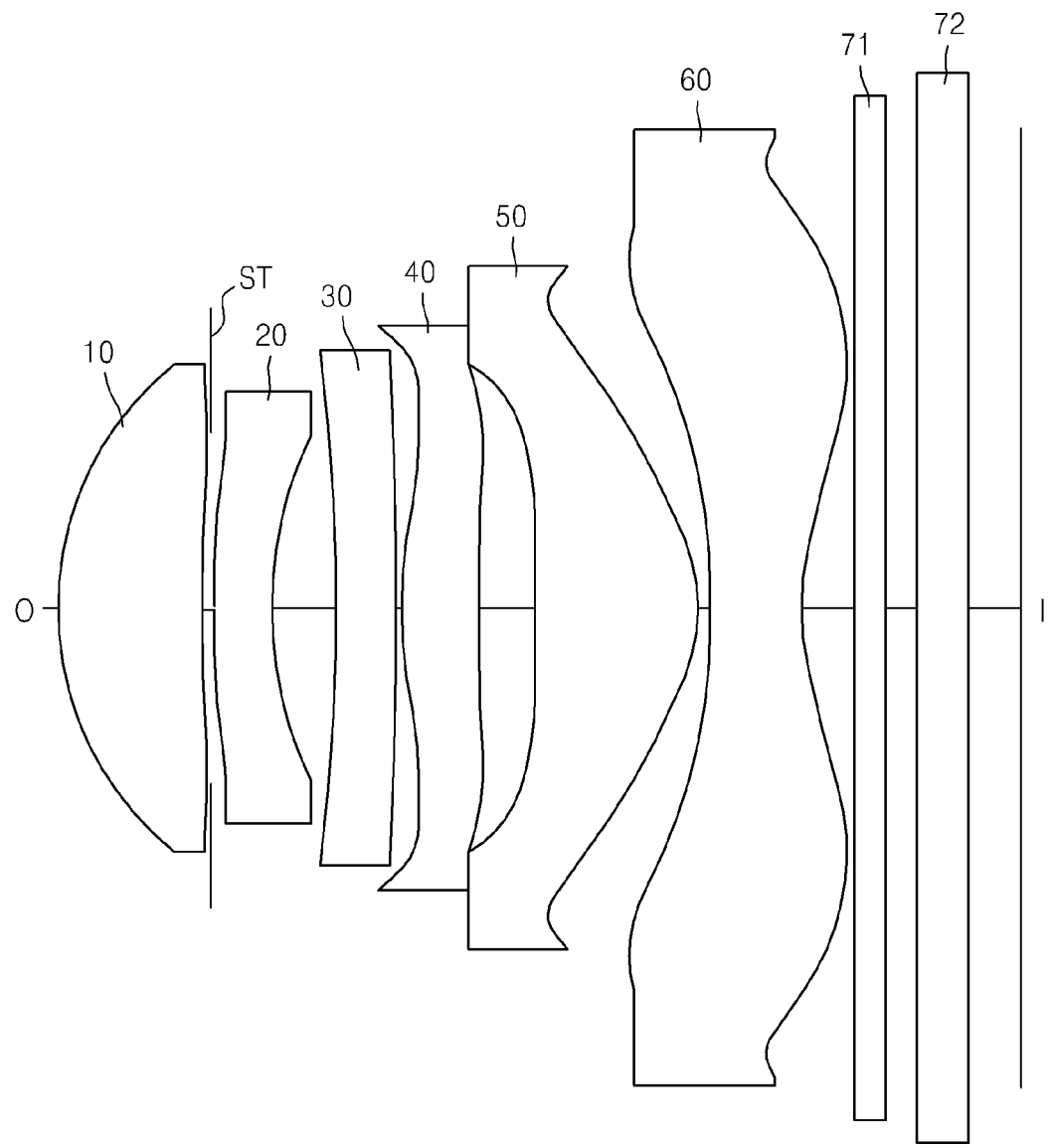
FIG. 7 is a diagram illustrating a photographic lens, according to still another embodiment.

FIG. 7 is a diagram illustrating a photographic lens, according to still another embodiment. Design data of Embodiment 3 is shown as follows.

In Embodiment 3, first to sixth lenses 10 to 60 have P-N-P-P-P-N type refractive powers and a stop ST is arranged on an image-side of the first lens 10. The third lens 30 may have both spherical surfaces. An F number is F/1.88, a half angle of view is 32.56°, a total length (TL) is 9.60 mm, and an entire focal length (f) is 7.55 mm.

TABLE 5

| Lens surface | Radius Curvature | Thickness | Refractive index (nd) | Abbe number (vd) |
|---|---|---|---|---|
| obj | infinity | infinity | | |
| S1* | 3.335 | 1.424 | 1.583 | 59.04 |
| S2*(ST) | 33.354 | 0.214 | | |
| S3* | 7.366 | 0.600 | 1.651 | 21.54 |
| S4* | 3.538 | 0.514 | | |
| S5 | −36.240 | 0.550 | 1.531 | 55.75 |
| S6 | −30.393 | 0.040 | | |
| S7* | 9.407 | 0.746 | 1.531 | 55.75 |
| S8* | 15.638 | 0.664 | | |
| S9* | −10.014 | 1.600 | 1.531 | 55.75 |
| S10* | −1.496 | 0.048 | | |
| S11* | −8.136 | 0.987 | 1.531 | 55.75 |
| S12* | 1.822 | 0.580 | | |
| S13 | infinity | 0.300 | 1.517 | 64.2 |
| S14 | infinity | 0.300 | | |
| S15 | infinity | 0.500 | 1.517 | 64.2 |
| S16 | infinity | 0.522 | | |
| img | infinity | 0.010 | | |

Conic constants (K) and aspherical coefficients (A, B, C, D, E, and F) are shown as follows.

TABLE 6

| Lens surface | K | A | B | C | D | E | F |
|---|---|---|---|---|---|---|---|
| S1 | 0.0000E+00 | 2.7731E−04 | 1.5467E−04 | 1.6414E−05 | 1.0508E−06 | | |
| S2 | 0.0000E+00 | −1.0580E−02 | 6.0583E−03 | −1.3465E−03 | 1.0555E−04 | | |
| S3 | 0.0000E+00 | −3.0566E−02 | 1.2686E−02 | −2.9659E−03 | 2.5226E−04 | | |
| S4 | 0.0000E+00 | −2.4830E−02 | 9.4221E−03 | −2.0815E−03 | 1.9956E−04 | | |
| S7 | 0.0000E+00 | −1.2824E−02 | 2.6316E−04 | 1.9175E−04 | −3.2604E−05 | | |
| S8 | 0.0000E+00 | −9.1650E−03 | −3.1691E−05 | 0.0000E+00 | 0.0000E+00 | | |
| S9 | 0.0000E+00 | −5.2209E−03 | 4.9345E−04 | −6.6984E−04 | 1.1876E−04 | −1.0558E−05 | |
| S10 | −4.8221E+00 | −1.5855E−02 | 2.7804E−03 | −4.7440E−04 | 3.7441E−05 | −3.5483E−07 | |
| S11 | −1.8693E+02 | −1.3506E−02 | 7.7481E−04 | 2.4694E−05 | −1.5954E−06 | −2.2566E−09 | |
| S12 | −8.2633E+00 | −9.7284E−03 | 1.0526E−03 | −1.0682E−04 | 6.4574E−06 | −2.3139E−07 | 3.9624E−09 |

Figure 8:
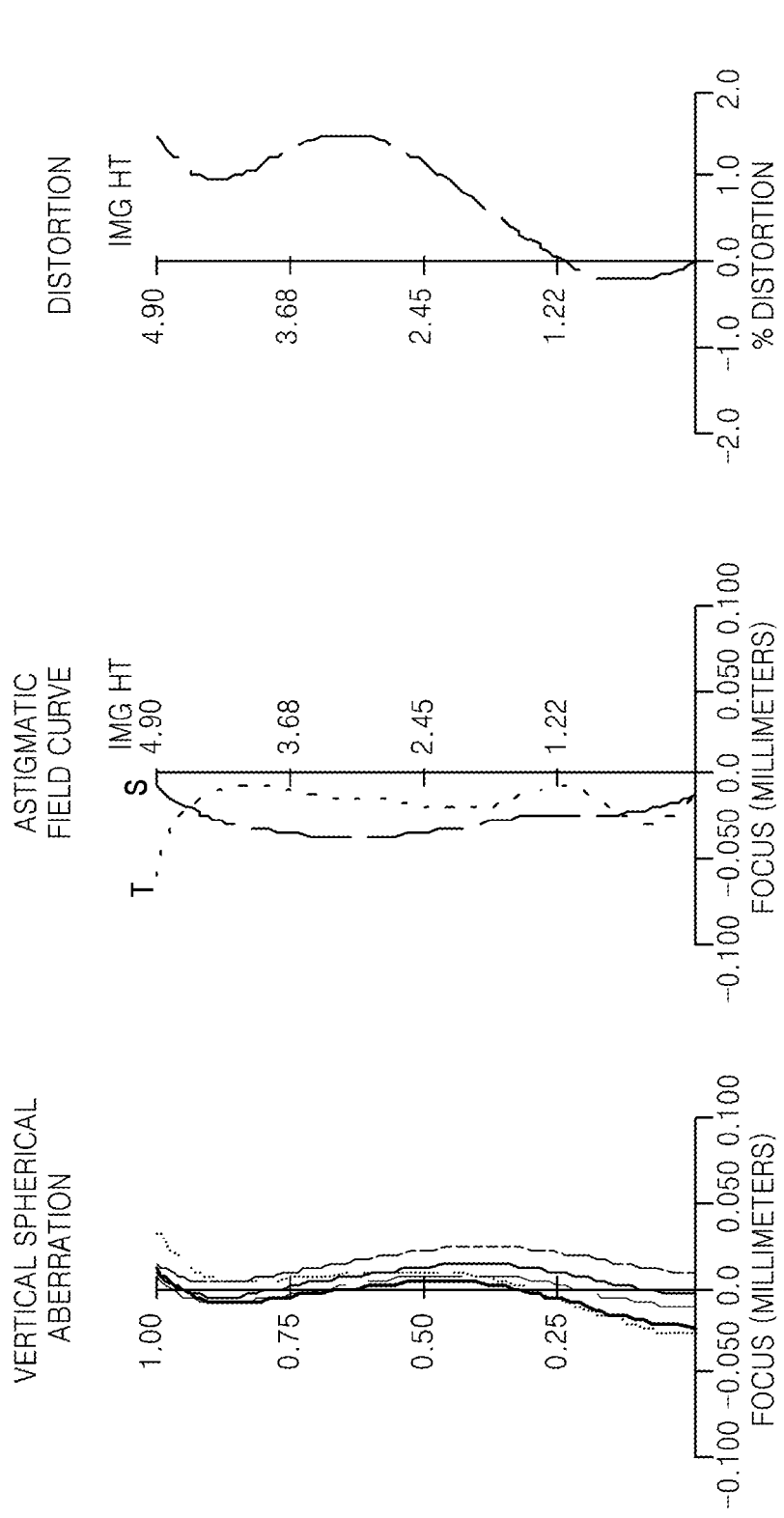
FIG. 8 is a diagram illustrating longitudinal aberrations, astigmatic field curves, and distortions of the photographic lens of FIG. 7.
Figure 9:
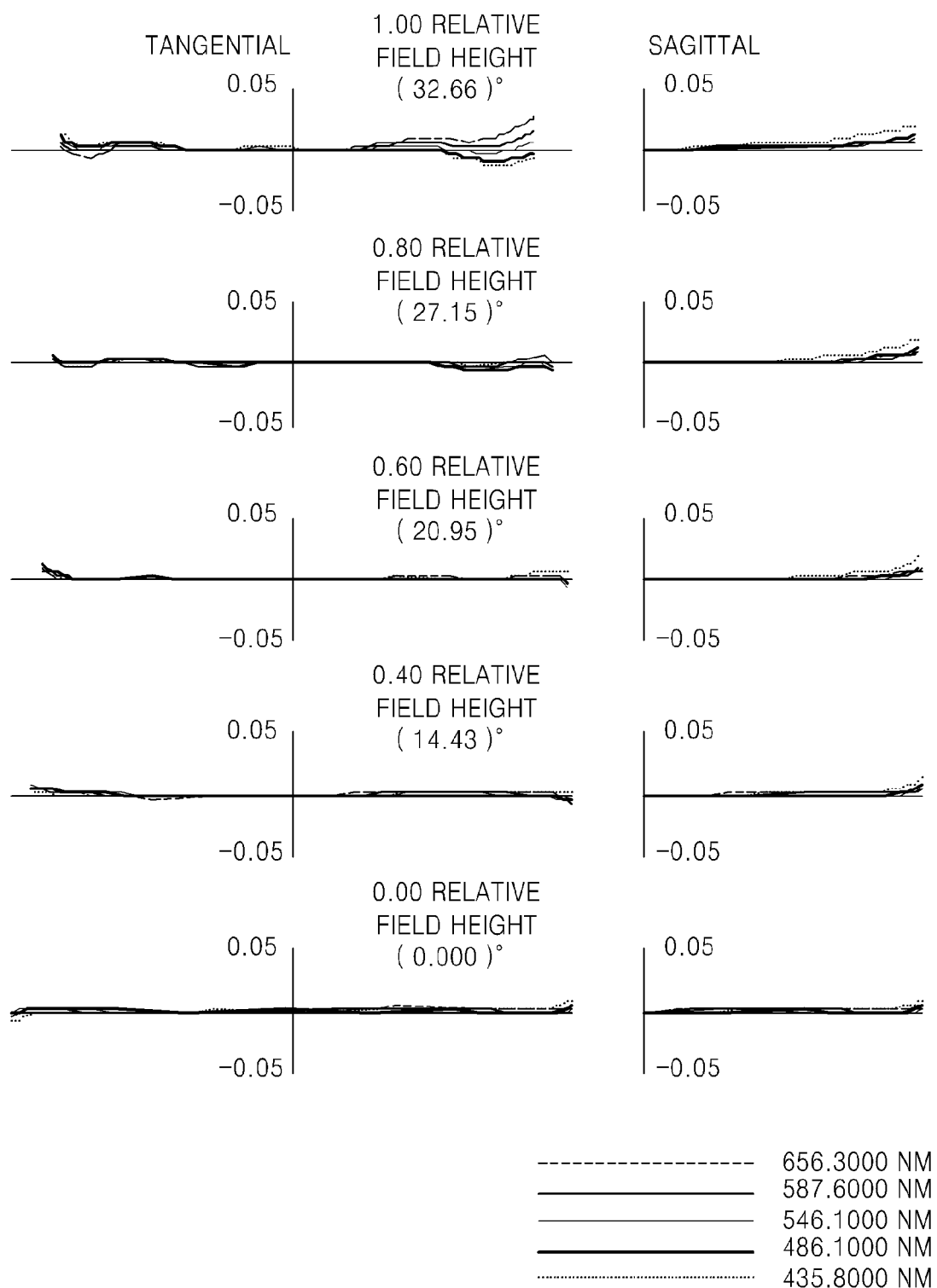
FIG. 9 is a diagram illustrating coma-aberration of the photographic lens of FIG. 7.

FIG. 8 illustrates longitudinal spherical aberrations, astigmatic field curves, and distortions of the photographic lens of FIG. 7. As the astigmatic field curves, tangential field curvatures (T) and sagittal field curvatures (S) are shown. FIG. 9 is a coma-aberration diagram of the photographic lens of FIG. 7.

<Embodiment 4>

Figure 10:
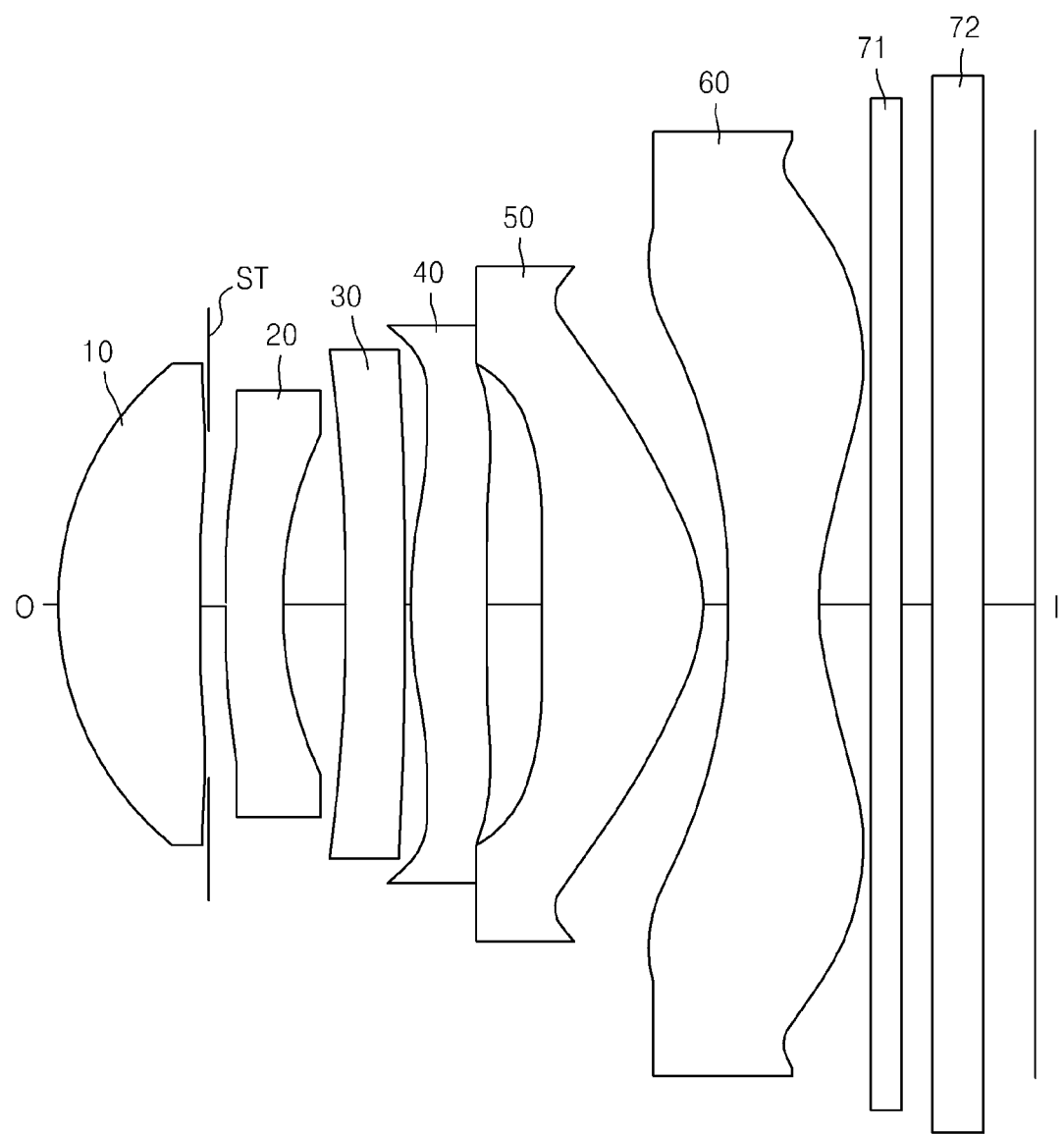
FIG. 10 is a diagram illustrating a photographic lens, according to yet another embodiment.

FIG. 10 is a diagram illustrating a photographic lens, according to yet another embodiment. Design data of Embodiment 4 is shown as follows. In Embodiment 4, first to sixth lenses 10 to 60 have P-N-P-P-P-N type refractive powers and a stop ST is arranged on an image-side of the first lens 10. The third lens may have both spherical surfaces. An F number is F/1.87, a half angle of view is 32.81°, a full length (TL) is 9.60 mm, and an entire focal length (f) is 7.50 mm.

TABLE 7

| Lens surface | Radius Curvature | Thickness | Refractive index (nd) | Abbe number (vd) |
|---|---|---|---|---|
| obj | infinity | infinity | | |
| S1* | 3.257 | 1.420 | 1.544 | 56.11 |
| S2*(ST) | −137.671 | 0.180 | | |
| S3* | 7.944 | 0.600 | 1.651 | 21.54 |
| S4* | 3.350 | 0.529 | | |
| S5 | −36.240 | 0.550 | 1.544 | 56.11 |
| S6 | −30.390 | 0.040 | | |
| S7* | 9.407 | 0.746 | 1.544 | 56.11 |
| S8* | 15.638 | 0.644 | | |
| S9* | −9.571 | 1.600 | 1.531 | 55.75 |
| S10* | −1.719 | 0.203 | | |
| S11* | −17.662 | 0.900 | 1.544 | 56.11 |
| S12* | 1.974 | 0.555 | | |
| S13 | infinity | 0.300 | 1.517 | 64.2 |
| S14 | infinity | 0.300 | | |
| S15 | infinity | 0.500 | 1.517 | 64.2 |
| S16 | infinity | 0.521 | | |
| img | infinity | 0.010 | | |

Conic constants (K) and aspherical coefficients (A, B, C, D, E, and F) are shown as follows.

TABLE 8

| Lens surface | K | A | B | C | D | E | F |
|---|---|---|---|---|---|---|---|
| S1 | 0.0000E+00 | 7.6330E−04 | 1.9199E−04 | 1.4364E−05 | 8.6656E−06 | | |
| S2 | 0.0000E+00 | −3.3119E−03 | 4.3710E−03 | −1.0035E−03 | 6.6622E−05 | | |
| S3 | 0.0000E+00 | −2.3187E−02 | 9.9779E−03 | −2.4587E−03 | 1.8368E−04 | | |
| S4 | 0.0000E+00 | −2.4132E−02 | 8.4223E−03 | −1.9513E−03 | 1.8146E−04 | | |
| S7 | 0.0000E+00 | −1.2824E−02 | 2.6316E−04 | 1.9175E−04 | −3.2604E−05 | | |
| S8 | 0.0000E+00 | −9.1650E−03 | −3.1691E−05 | 0.0000E+00 | 0.0000E+00 | | |
| S9 | 0.0000E+00 | −3.8954E−03 | 1.1601E−04 | −5.8395E−04 | 1.1353E−04 | −1.0290E−05 | |
| S10 | −4.4971E+00 | −1.4747E−02 | 2.2788E−03 | −3.8762E−04 | 3.2274E−05 | −2.9870E−07 | |
| S11 | −6.5112E+02 | −1.5498E−02 | 9.3667E−04 | 3.3879E−05 | −3.4688E−06 | 6.3697E−08 | |
| S12 | −7.4259E+00 | −1.0789E−02 | 1.1325E−03 | −1.0702E−04 | 6.1849E−06 | −2.0890E−07 | 3.3683E−09 |

Figure 11:
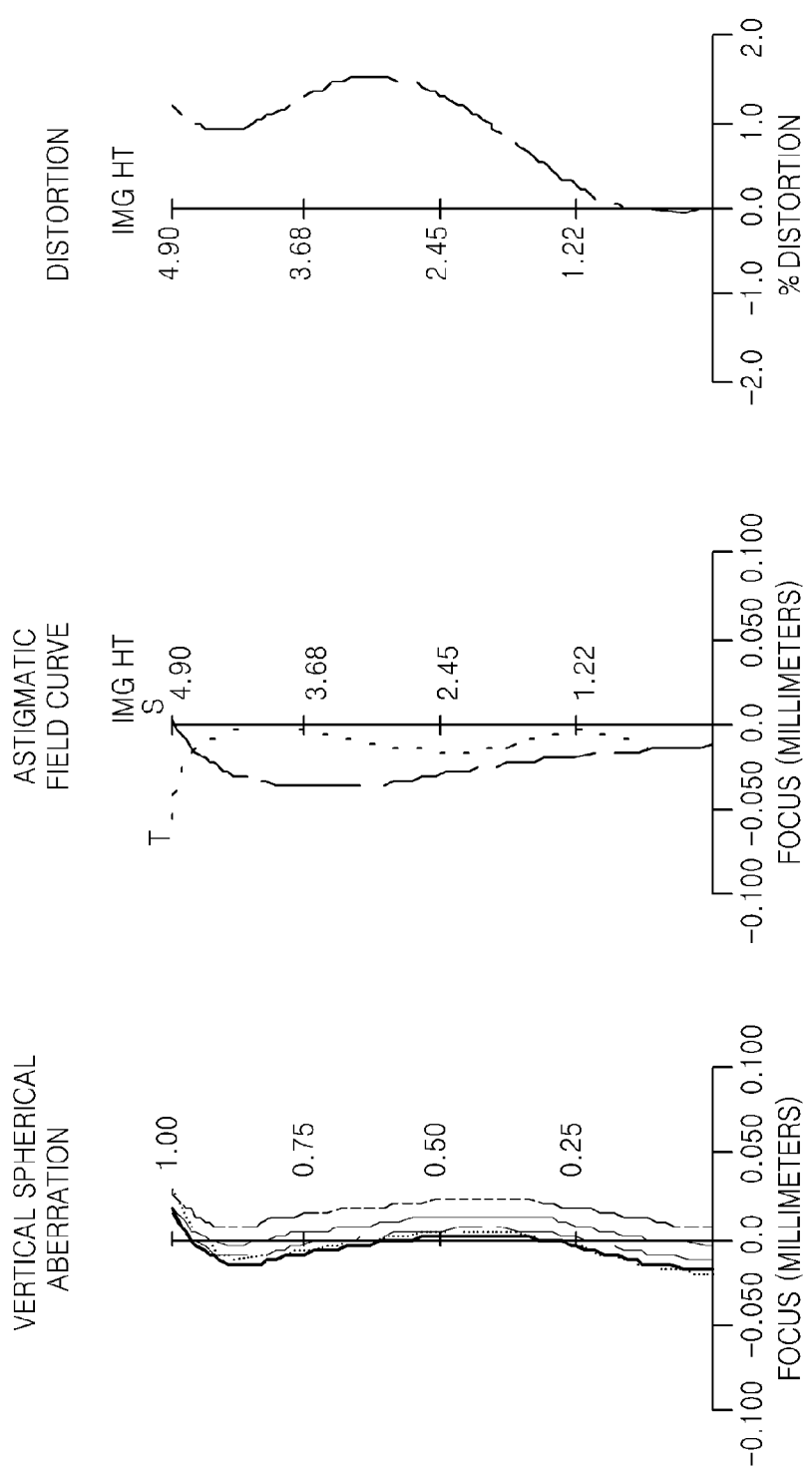
FIG. 11 is a diagram illustrating longitudinal aberrations, astigmatic field curves, and distortions of the photographic lens of FIG. 10.
Figure 12:
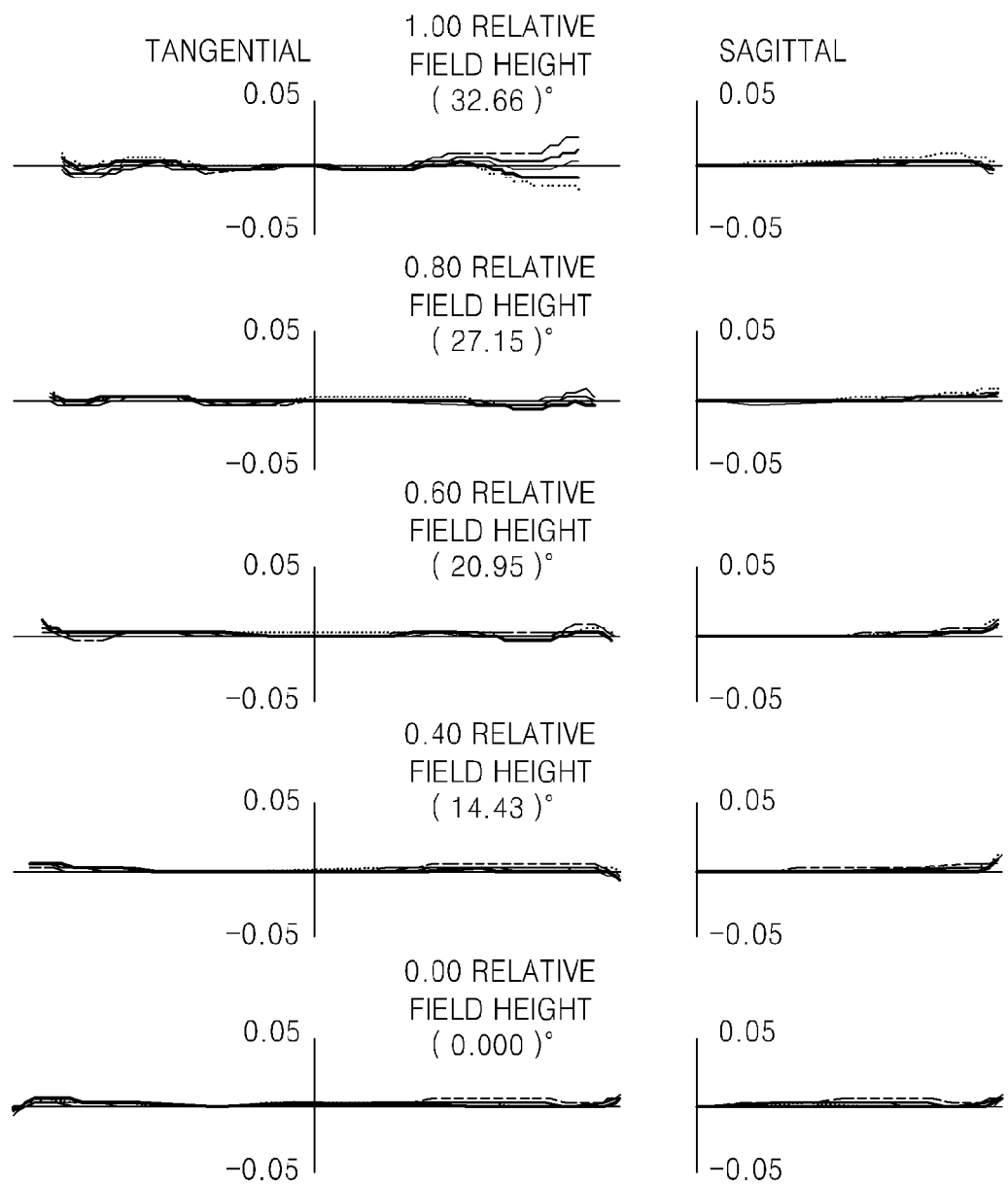
FIG. 12 is a diagram illustrating coma-aberration of the photographic lens of FIG. 10.

FIG. 11 illustrates longitudinal spherical aberrations, astigmatic field curves, and distortions of the photographic lens of FIG. 10. As the astigmatic field curves, tangential field curvatures (T) and sagittal field curvatures (S) are shown. FIG. 12 is a coma-aberration diagram of the photographic lens of FIG. 10.

<Embodiment 5>

Figure 13:
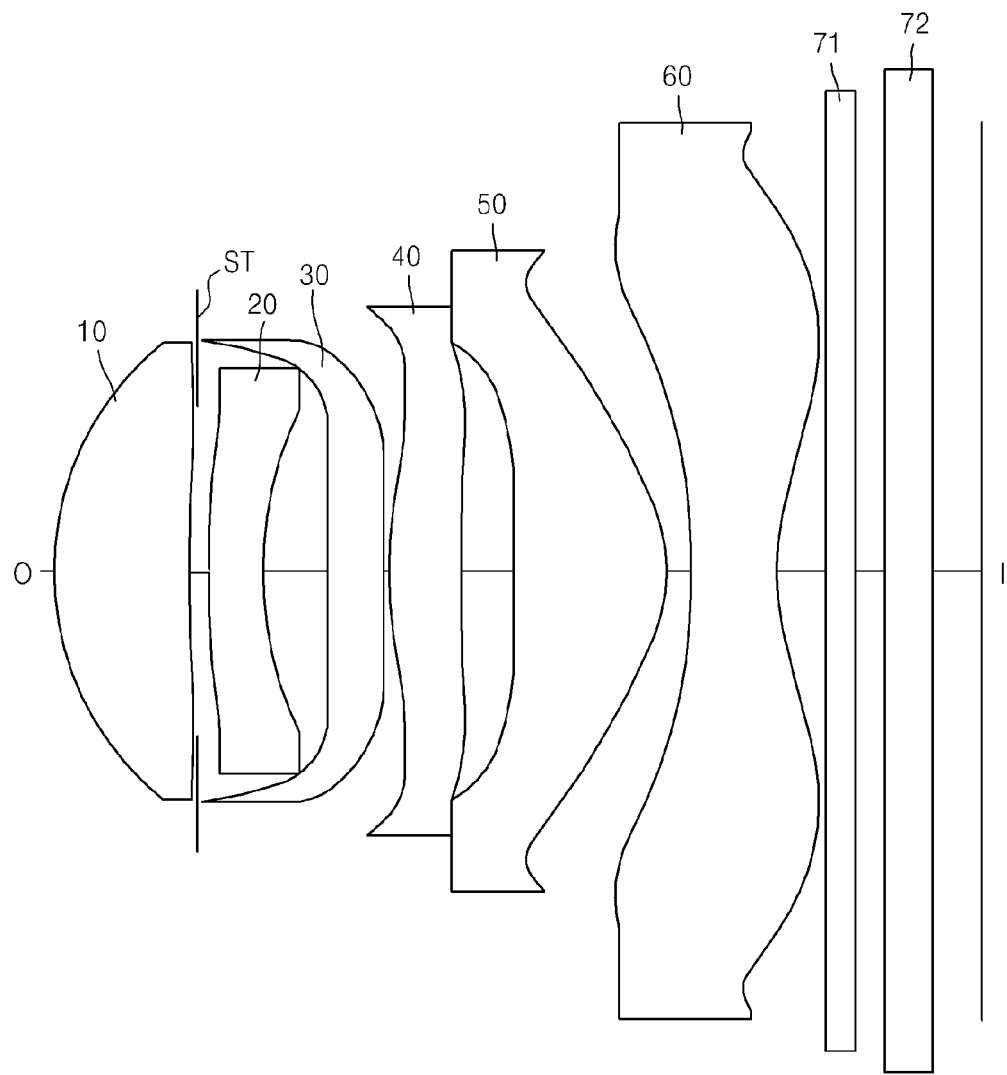
FIG. 13 is a diagram illustrating a photographic lens, according to a further embodiment.

FIG. 13 is a diagram illustrating a photographic lens, according to a further embodiment. Design data of Embodiment 5 is shown as follows. In Embodiment 5, first to sixth lenses 10 to 60 have P-N-P-N-P-N type refractive powers and a stop ST is arranged on an image-side of the first lens 10. The third lens may have both aspherical surfaces. An F number is F/1.87, a half angle of view is 32.79°, a total length (TL) is 9.60 mm, and an entire focal length (f) is 7.50 mm.

TABLE 9

| Lens surface | Radius Curvature | Thickness | Refractive index (nd) | Abbe number (vd) |
|---|---|---|---|---|
| obj | infinity | infinity | | |
| S1* | 3.346 | 1.396 | 1.544 | 56.11 |
| S2*(ST) | −181.735 | 0.161 | | |
| S3* | 7.383 | 0.580 | 1.651 | 21.54 |
| S4* | 3.267 | 0.793 | | |
| S5* | 131.746 | 0.568 | 1.544 | 56.11 |
| S6* | −20.926 | 0.040 | | |
| S7* | 9.630 | 0.548 | 1.544 | 56.11 |
| S8* | 8.955 | 0.624 | | |
| S9* | −13.880 | 1.587 | 1.531 | 55.75 |
| S10* | −1.715 | 0.232 | | |
| S11* | −9.603 | 0.900 | 1.544 | 56.11 |
| S12* | 2.076 | 0.538 | | |
| S13 | infinity | 0.300 | 1.517 | 64.2 |
| S14 | infinity | 0.300 | | |
| S15 | infinity | 0.500 | 1.517 | 64.2 |
| S16 | infinity | 0.522 | | |
| img | infinity | 0.010 | | |

Conic constants (K) and aspherical coefficients (A, B, C, D, E, and F) are shown as follows.

TABLE 10

| Lens surface | K | A | B | C | D | E | F |
|---|---|---|---|---|---|---|---|
| 1 | 0.0000E+00 | 7.9045E−04 | 9.0958E−05 | 3.5561E−05 | 2.8531E−06 | | |
| 2 | 0.0000E+00 | −4.0164E−03 | 4.3586E−03 | −1.0430E−03 | 7.9637E−05 | | |
| 3 | 0.0000E+00 | −2.3310E−02 | 9.3867E−03 | −2.2916E−03 | 1.9297E−04 | | |
| 4 | 0.0000E+00 | −2.3099E−02 | 7.2908E−03 | −1.7619E−03 | 1.7731E−04 | | |
| 5 | 0.0000E+00 | −3.9754E−03 | −1.0856E−03 | 1.2058E−04 | −1.1398E−04 | | |
| 6 | 0.0000E+00 | −1.8281E−03 | −4.3708E−04 | −4.0507E−05 | −6.6603E−05 | | |
| 7 | 0.0000E+00 | −1.2824E−02 | 2.6316E−04 | 1.9175E−04 | −3.2604E−05 | | |
| 8 | 0.0000E+00 | −1.3016E−02 | −4.0466E−04 | −1.0013E−05 | −8.3743E−07 | | |
| 9 | 0.0000E+00 | −2.4335E−03 | 7.5750E−05 | −6.4068E−04 | 1.0844E−04 | −1.2481E−05 | |
| 10 | −4.5244E+00 | −1.2690E−02 | 2.3371E−03 | −3.8086E−04 | 3.2152E−05 | −6.7759E−07 | |
| 11 | −1.5657E+02 | −1.5362E−02 | 9.3412E−04 | 3.4638E−05 | −3.3661E−06 | 5.7801E−08 | |
| 12 | −7.8307E+00 | −1.0542E−02 | 1.1403E−03 | −1.0904E−04 | 6.2237E−06 | −2.0649E−07 | 3.3869E−09 |

Figure 14:
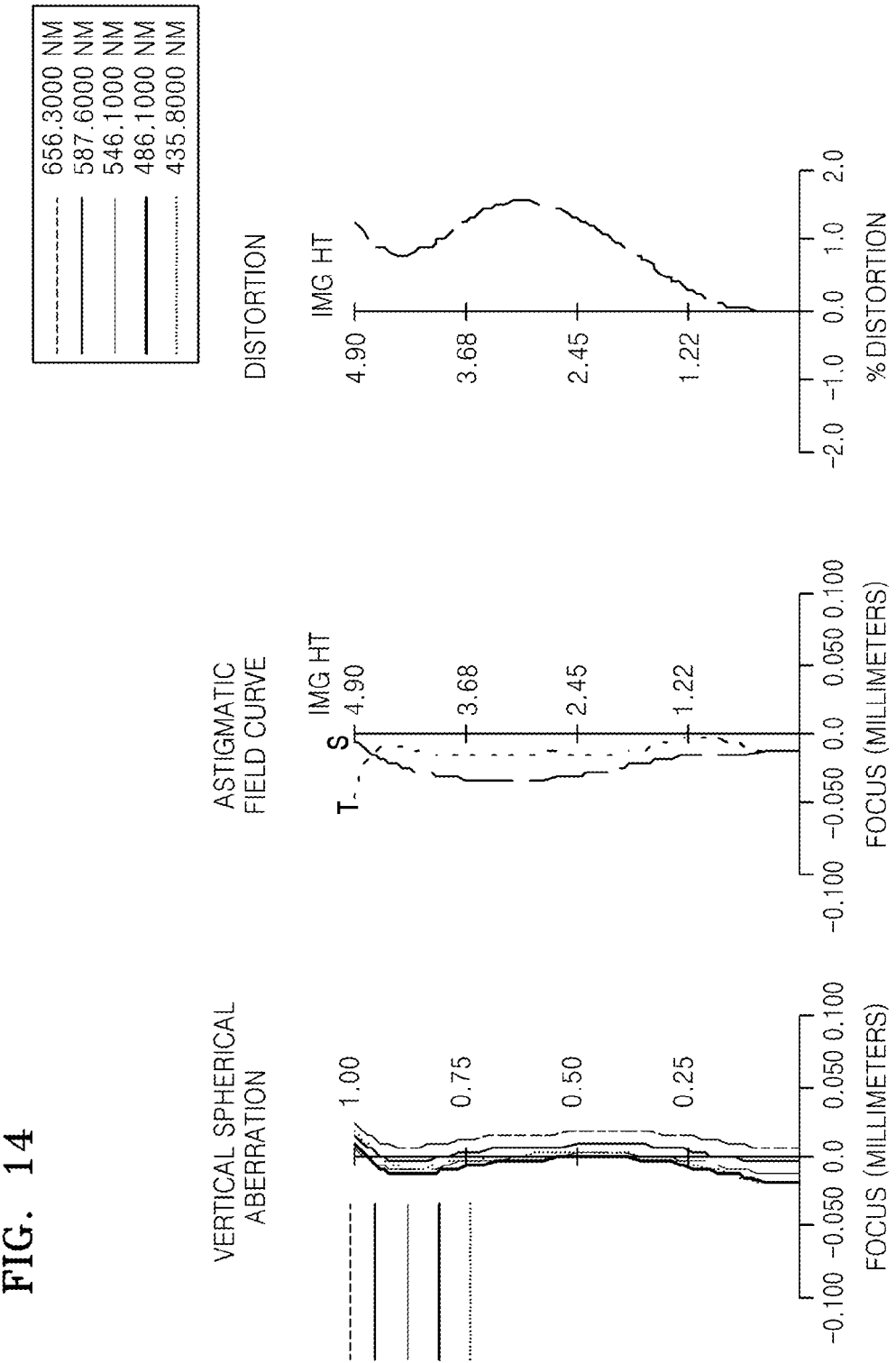
FIG. 14 is a diagram illustrating longitudinal aberrations, astigmatic field curves, and distortions of the photographic lens of FIG. 13.
Figure 15:
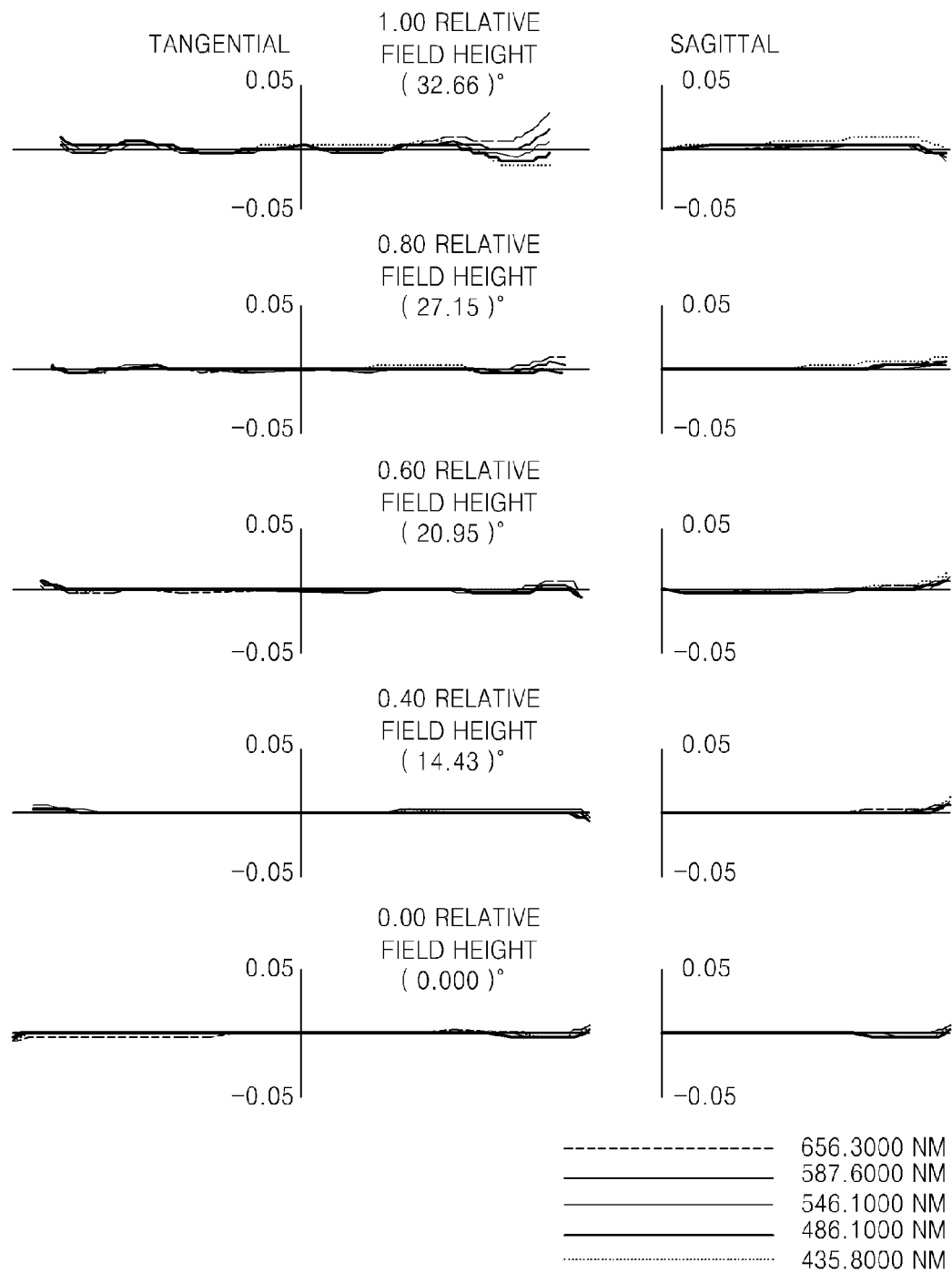
FIG. 15 is a diagram illustrating coma-aberration of the photographic lens of FIG. 13.

FIG. 14 illustrates longitudinal spherical aberrations, astigmatic field curves, and distortions of the photographic lens of FIG. 13. As the astigmatic field curves, tangential field curvatures (T) and sagittal field curvatures (S) are shown. FIG. 15 is a coma-aberration diagram of the photographic lens of FIG. 13.

<Embodiment 6>

Figure 16:
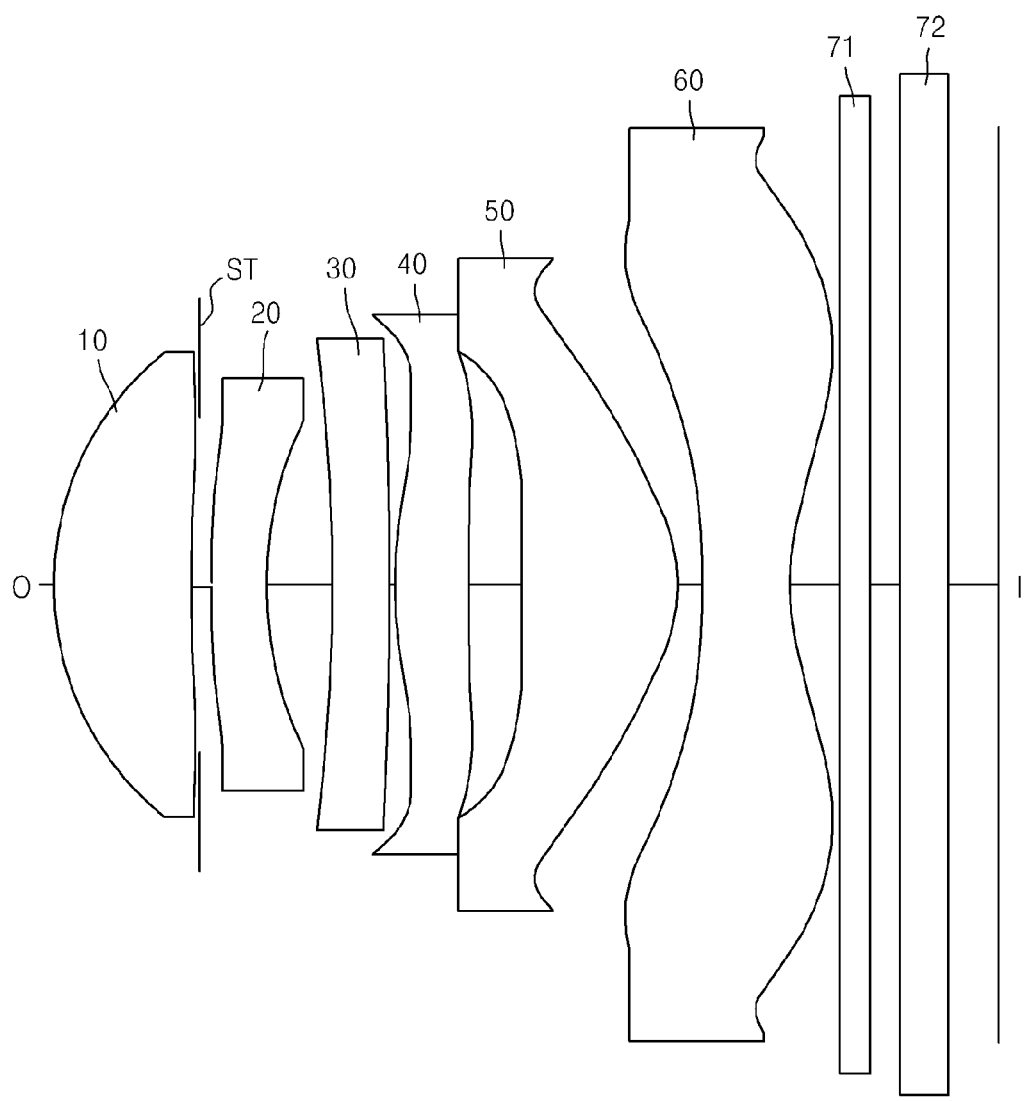
FIG. 16 is a diagram illustrating a photographic lens, according to a still further embodiment.

FIG. 16 is a view illustrating a photographic lens, according to a still further embodiment. Design data of Embodiment 6 is shown as follows. In Embodiment 6, first to sixth lenses 10 to 60 have P-N-N-P-P-N type refractive powers and a stop ST is arranged between the first and second lenses 10 and 20. An F number is F/1.68, a half angle of view is 32.74°, a full length (TL) is 9.50 mm, and a total focal length (f) is 7.50 mm.

TABLE 11

| Lens surface | Radius Curvature | Thickness | Refractive index (nd) | Abbe number (vd) |
|---|---|---|---|---|
| obj | infinity | infinity | | |
| S1* | 3.337 | 1.395 | 1.544 | 56.11 |
| S2* | −67.701 | 0.050 | | |
| S3(ST) | infinity | 0.150 | | |
| S4* | 7.379 | 0.580 | 1.651 | 21.54 |
| S5* | 3.290 | 0.640 | | |
| S6 | −38.072 | 0.550 | 1.544 | 56.11 |
| S7 | −41.132 | 0.043 | | |
| S8* | 7.079 | 0.695 | 1.544 | 56.11 |
| S9* | 10.065 | 0.663 | | |
| S10* | −18.273 | 1.557 | 1.531 | 55.75 |
| S11* | −1.841 | 0.234 | | |
| S12* | −7.205 | 0.900 | 1.544 | 56.11 |
| S13* | 2.362 | 0.537 | | |
| S14 | infinity | 0.300 | 1.517 | 64.20 |
| S15 | infinity | 0.300 | | |
| S16 | infinity | 0.500 | 1.517 | 64.20 |
| S17 | infinity | 0.394 | | |
| img | infinity | 0.010 | | |

Conic constants (K) and aspherical coefficients (A, B, C, D, E, and F) are shown as follows.

TABLE 12

| Lens surface | K | A | B | C | D | E | F |
|---|---|---|---|---|---|---|---|
| S1 | 0.0000E+00 | 3.6654E−04 | −3.4471E−05 | 4.4125E−05 | 2.0032E−06 | | |
| S2 | 0.0000E+00 | −3.9715E−03 | 3.7979E−03 | −7.5030E−04 | 4.8554E−05 | | |
| S4 | 0.0000E+00 | −2.4070E−02 | 1.0138E−02 | −2.2174E−03 | 1.6550E−04 | | |
| S5 | 0.0000E+00 | −2.5347E−02 | 8.8856E−03 | −1.9425E−03 | 1.6922E−04 | | |
| S8 | 0.0000E+00 | −1.2824E−02 | 2.6316E−04 | 1.9175E−04 | −3.2604E−05 | | |
| S9 | 0.0000E+00 | −1.1346E−02 | −1.0104E−04 | 5.3380E−05 | −9.1268E−06 | | |
| S10 | 0.0000E+00 | −5.8678E−03 | −1.3478E−04 | −6.3827E−04 | 1.2626E−04 | −1.2268E−05 | |
| S11 | −5.1027E+00 | −1.3262E−02 | 1.9447E−03 | −3.8884E−04 | 3.2050E−05 | −1.2964E−07 | |
| S12 | −8.6410E+01 | −1.6075E−02 | 9.8423E−04 | 3.7361E−05 | −3.4192E−06 | 4.9999E−08 | |
| S13 | −8.7169E+00 | −1.0201E−02 | 1.0842E−03 | −1.0755E−04 | 6.2678E−06 | −2.1409E−07 | 3.6374E−09 |

Figure 17:
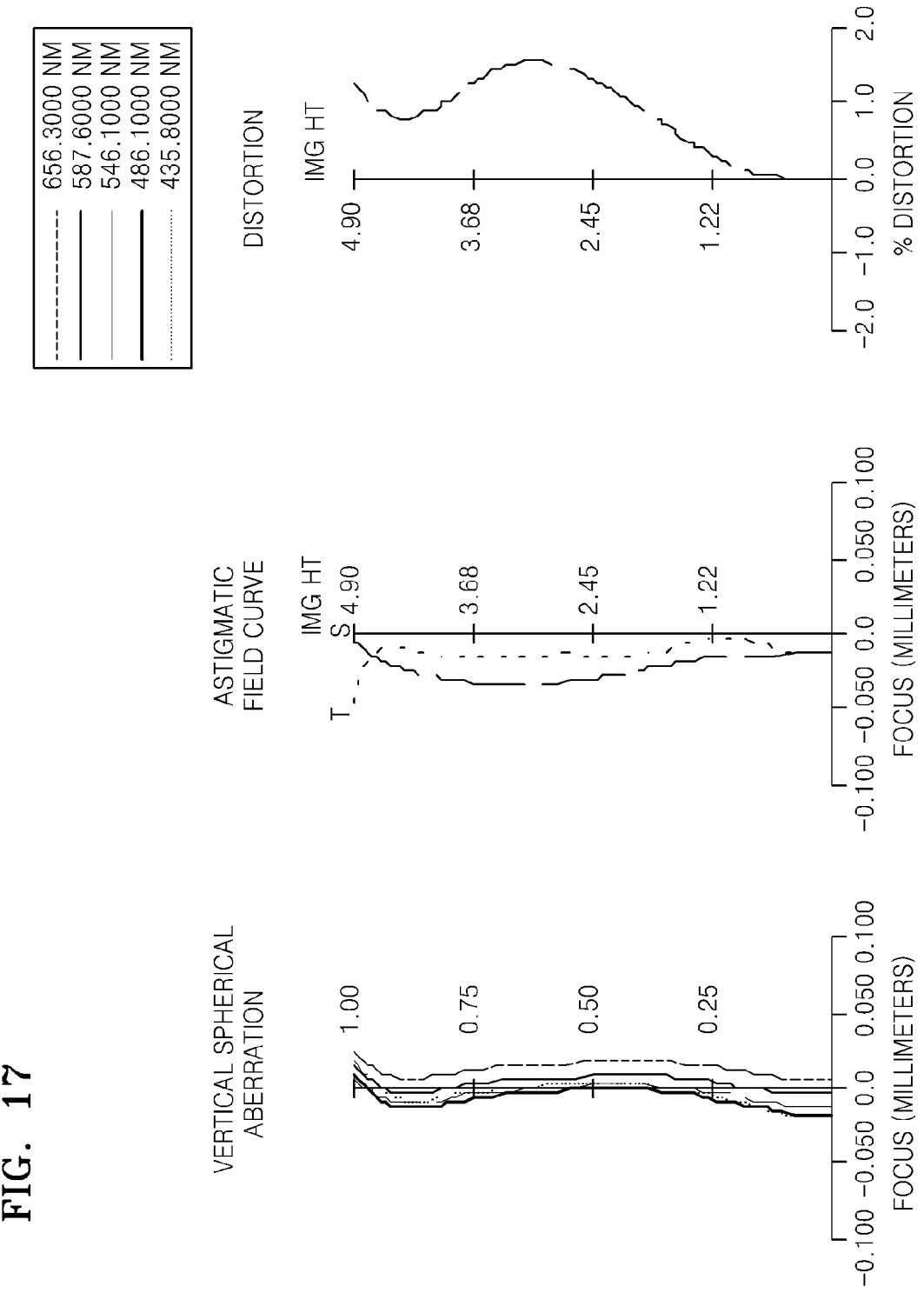
FIG. 17 is a diagram illustrating longitudinal aberrations, astigmatic field curves, and distortions of the photographic lens of FIG. 16.
Figure 18:
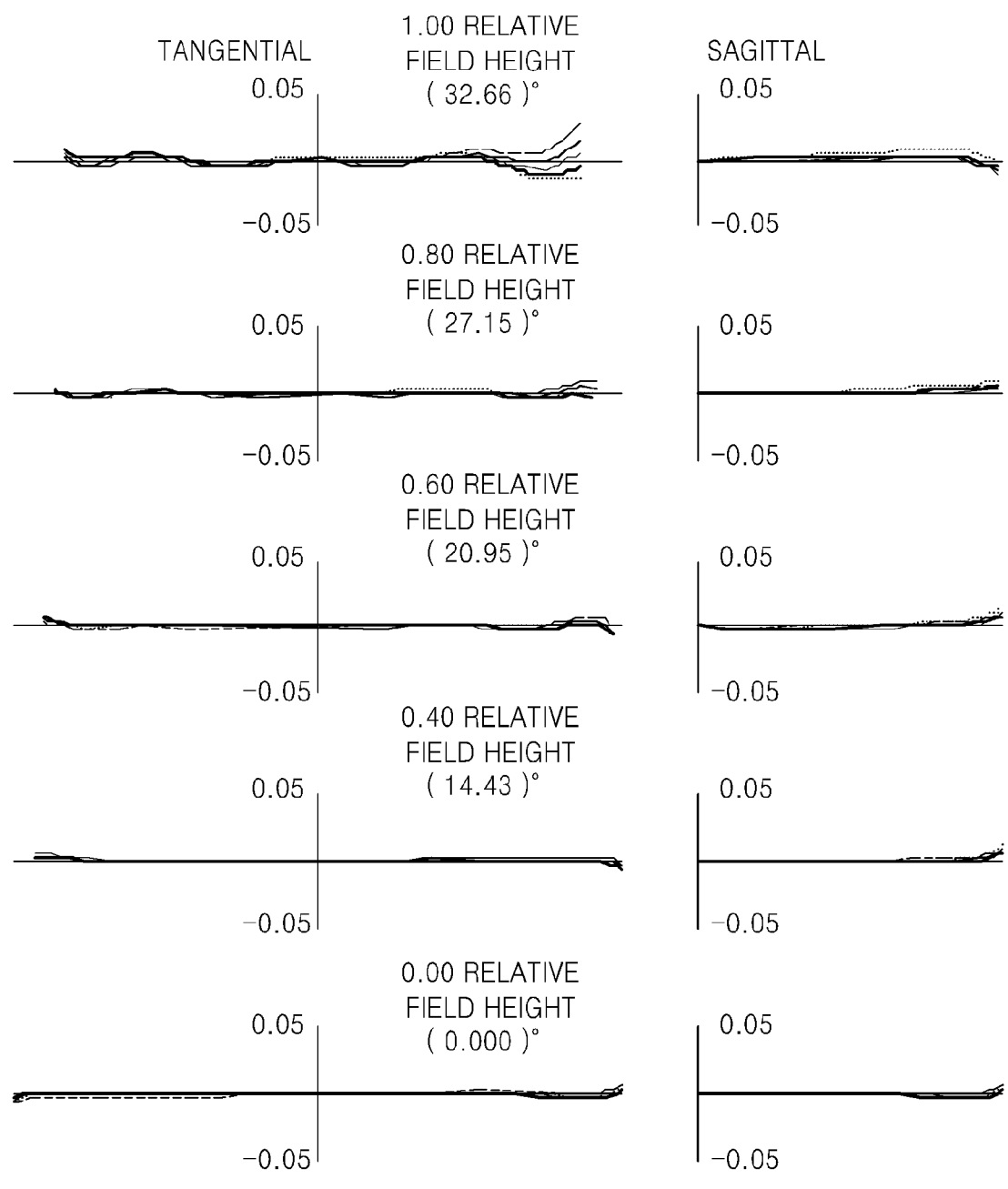
FIG. 18 is a diagram illustrating coma-aberration of the photographic lens of FIG. 16.

FIG. 17 illustrates longitudinal spherical aberrations, astigmatic field curves, and distortions of the photographic lens of FIG. 16. As the astigmatic field curves, tangential field curvatures (T) and sagittal field curvatures (S) are shown. FIG. 18 is a coma-aberration diagram of the photographic lens of FIG. 16.

<Embodiment 7>

Figure 19:
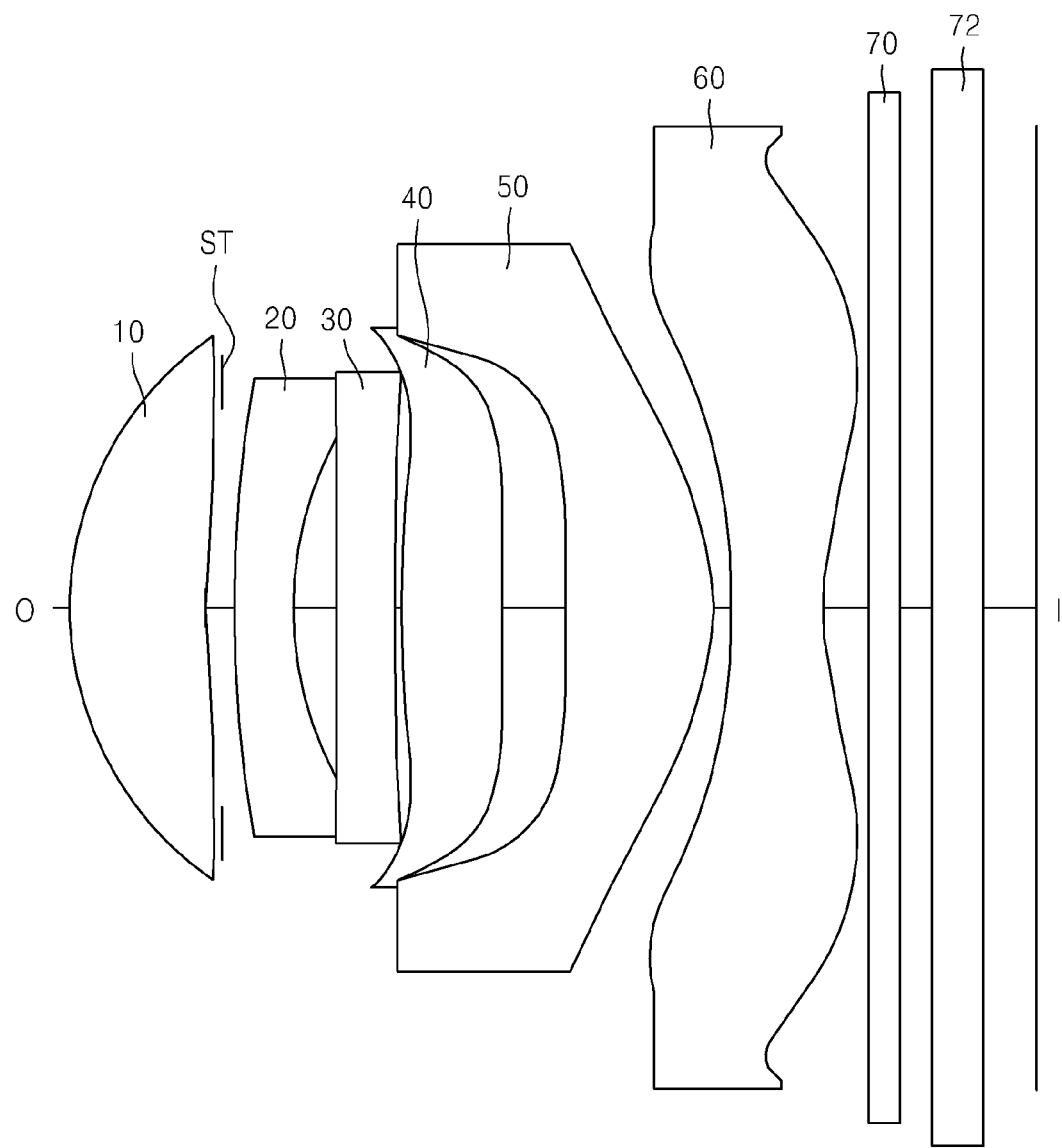
FIG. 19 is a diagram illustrating a photographic lens, according to a yet further embodiment.
Figure 20:
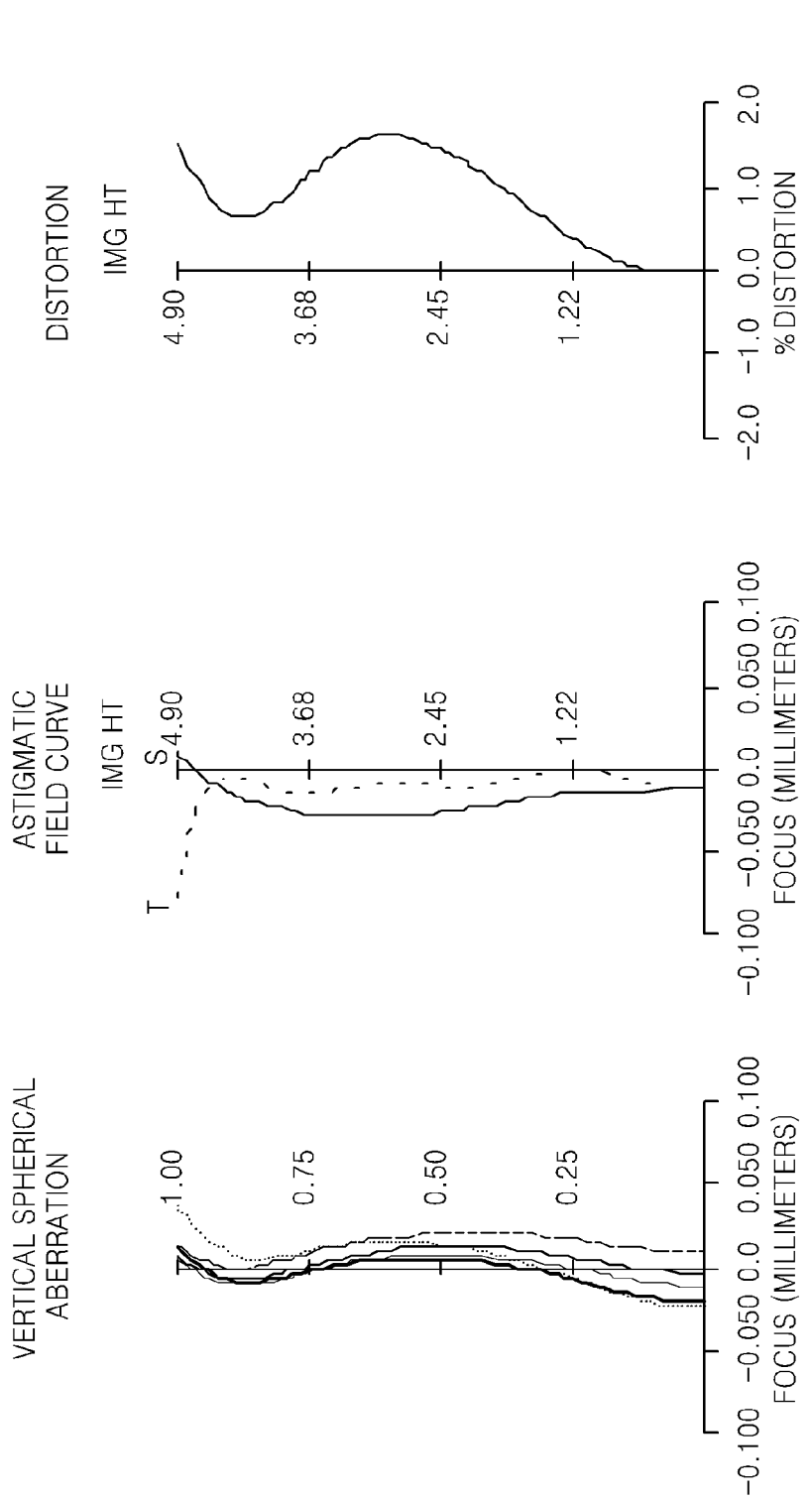
FIG. 20 is a diagram illustrating longitudinal aberrations, astigmatic field curves, and distortions of the photographic lens of FIG. 19.
Figure 21:
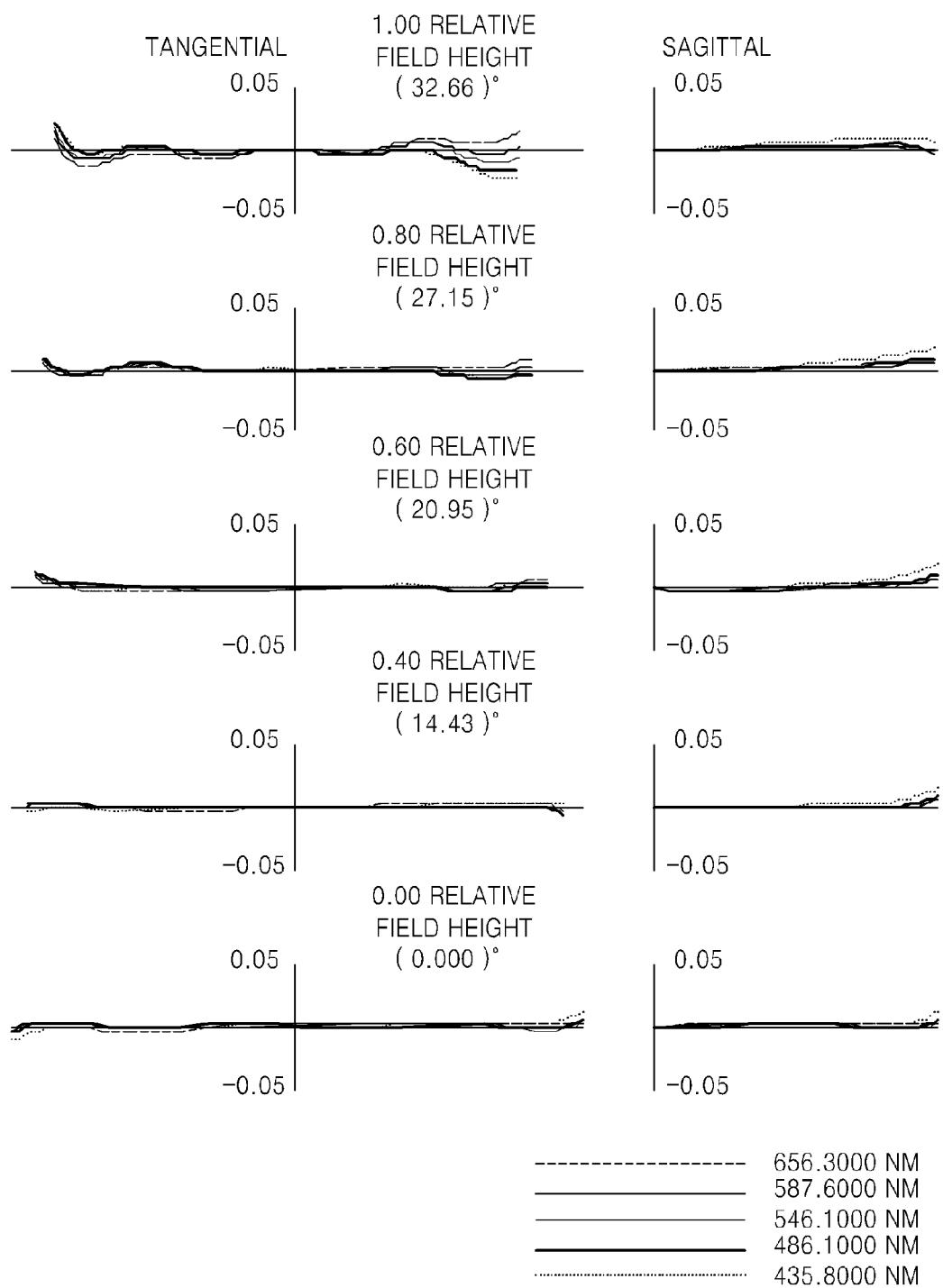
FIG. 21 is a diagram illustrating coma-aberration of the photographic lens of FIG. 19.

FIG. 19 is a view illustrating a photographic lens, according to a yet further embodiment. Design data of Embodiment 7 is shown as follows. In Embodiment 7, first to sixth lenses 10 to 60 have P-N-N-P-P-N type refractive powers and a stop ST is arranged between the first and second lenses 10 and 20. An F number is F/1.69, a half angle of view is 32.55°, a total length (TL) is 9.46 mm, and an entire focal length (f) is 7.55 mm.

TABLE 13

| Lens surface | Radius Curvature | Thickness | Refractive index (nd) | Abbe number (vd) |
|---|---|---|---|---|
| obj | infinity | infinity | | |
| S1 | infinity | 0.000 | | |
| S2* | 3.390 | 1.332 | 1.627 | 63.3 |
| S3* | 21.252 | 0.110 | | |
| S4(ST) | infinity | 0.170 | | |
| S5* | 6.805 | 0.580 | 1.651 | 21.54 |
| S6* | 3.500 | 0.428 | | |
| S7 | −94.674 | 0.550 | 1.544 | 56.11 |
| S8* | 27.562 | 0.084 | | |
| S9* | 8.344 | 0.990 | 1.544 | 56.11 |
| S10* | 48.879 | 0.619 | | |
| S11* | −14.741 | 1.469 | 1.544 | 56.11 |
| 512* | −2.079 | 0.164 | | |
| 513* | −11.766 | 0.900 | 1.544 | 56.11 |
| 514* | 2.346 | 0.431 | | |
| S15 | infinity | 0.300 | 1.517 | 64.20 |
| S16 | infinity | 0.300 | | |
| S17 | infinity | 0.500 | 1.517 | 64.20 |
| S18 | infinity | 0.518 | | |
| img | infinity | 0.010 | | |

Conic constants (K) and aspherical coefficients (A, B, C, D, E, and F) are shown as follows. Also, S1 surface may be a dummy surface.

TABLE 14

| Lens surface | K | A | B | C | D | E | F |
|---|---|---|---|---|---|---|---|
| S2 | 0.0000E+00 | 1.5892E−04 | −2.3734E−05 | 4.0818E−05 | −1.5847E−06 | | |
| S3 | 0.0000E+00 | −7.8092E−03 | 3.3398E−03 | −5.4882E−04 | 3.1744E−05 | | |
| S5 | 0.0000E+00 | −2.6316E−02 | 9.4402E−03 | −1.8123E−03 | 1.3035E−04 | | |
| S6 | 0.0000E+00 | −2.2933E−02 | 8.4821E−03 | −1.7452E−03 | 1.6180E−04 | | |
| S8 | 0.0000E+00 | −1.5802E−03 | 5.3818E−04 | 1.0904E−04 | 7.8264E−06 | | |

TABLE 14-continued

| Lens surface | K | A | B | C | D | E | F |
|---|---|---|---|---|---|---|---|
| S9 | 0.0000E+00 | −1.2824E−02 | 2.6316E−04 | 1.9175E−04 | −3.2604E−05 | | |
| S10 | 0.0000E+00 | −6.8583E−03 | −1.6274E−03 | 1.2149E−04 | −2.5329E−05 | | |
| S11 | 0.0000E+00 | 1.2280E−04 | −9.7444E−04 | −4.0222E−04 | 7.8132E−05 | −1.0750E−05 | |
| S12 | −5.7072E+00 | −6.7691E−03 | 1.6068E−03 | −3.2419E−04 | 3.4106E−05 | −1.2459E−06 | |
| S13 | −8.1535E+01 | −1.6052E−02 | 1.0126E−03 | 3.5748E−05 | −3.6216E−06 | 5.6915E−08 | |
| S14 | −9.6281E+00 | −1.1253E−02 | 1.1546E−03 | −1.1143E−04 | 6.1676E−06 | −2.1334E−07 | 4.0370E−09 |

Overall Lens data of Embodiments 1 to 7 are shown as follows.

TABLE 15

| Lens data | Embodiment 1 | Embodiment 2 | Embodiment 3 | Embodiment 4 | Embodiment 5 | Embodiment 6 | Embodiment 7 |
|---|---|---|---|---|---|---|---|
| Full length(TL) | 9.59 mm | 9.60 mm | 9.60 mm | 9.60 mm | 9.60 mm | 9.50 mm | 9.46 mm |
| Entire focal length(f) | 7.55 mm | 7.55 mm | 7.55 mm | 7.50 mm | 7.50 mm | 7.50 mm | 7.55 mm |
| Half angle of view | 32.59° | 32.66° | 32.56° | 32.81° | 32.79° | 32.74° | 32.55° |
| First lens focal length (f1) | 6.02 mm | 5.96 mm | 6.22 mm | 5.84 mm | 6.03 mm | 5.86 mm | 6.23 mm |
| Second lens focal length (f2) | −9.28 mm | −9.80 mm | −11.04 mm | −9.29 mm | −9.44 mm | −9.57 mm | −11.78 mm |
| Third lens focal length (f3) | −45.01 mm | 94.16 mm | 341.98 mm | 333.41 mm | 33.09 mm | −1000.00 mm | −39.00 mm |
| Fourth focal length (f4) | 19.15 mm | 45.39 mm | 42.49 mm | 41.45 mm | −327.68 mm | 40.34 mm | 18.25 mm |
| Fifth focal length (f5) | 3.20 mm | 3.04 mm | 3.09 mm | 3.67 mm | 3.51 mm | 3.72 mm | 4.25 mm |
| Sixth focal length (f6) | −2.78 mm | −2.63 mm | −2.70 mm | −3.20 mm | −3.04 mm | −3.15 mm | −3.50 mm |

It is shown that Embodiments 1 to 7 satisfy Equations 1 to 12 as follows.

TABLE 16

| Equation | Embodiment 1 | Embodiment 2 | Embodiment 3 | Embodiment 4 | Embodiment 5 | Embodiment 6 | Embodiment 7 |
|---|---|---|---|---|---|---|---|
| 0.7 < f/f1 < 1.5 | 1.253 | 1.268 | 1.214 | 1.284 | 1.244 | 1.28 | 1.212 |
| 0.9 < TL/f < 2.0 | 1.27 | 1.27 | 1.27 | 1.28 | 1.28 | 1.267 | 1.25 |
| 1.6 < Yimg/BF < 3.1 | 2.26 | 2.20 | 2.21 | 2.24 | 2.26 | 2.40 | 2.38 |
| Yimg/Tanθ > 6.0 mm | 7.66 mm | 7.64 mm | 7.67 mm | 7.60 mm | 7.61 mm | 7.62 mm | 7.68 mm |
| 0 < Dair34/D25 < 0.15 | 0.054 | 0.016 | 0.016 | 0.016 | 0.016 | 0.017 | 0.031 |
| vd2 < 30 | 21.54 | 21.54 | 21.54 | 21.54 | 21.54 | 21.54 | 21.54 |
| vd1 > 50 | 56.11 | 56.11 | 59.04 | 56.11 | 56.11 | 56.11 | 63.3 |
| vd5 > 50 | 55.75 | 55.75 | 55.75 | 55.75 | 55.75 | 55.75 | 56.11 |
| 1.58 < N2 < 1.68 | 1.651 | 1.651 | 1.651 | 1.651 | 1.651 | 1.651 | 1.651 |
| 1.51 < N5 < 1.56 | 1.531 | 1.531 | 1.531 | 1.531 | 1.531 | 1.531 | 1.544 |
| 1.51 < N6 < 1.56 | 1.544 | 1.531 | 1.531 | 1.544 | 1.544 | 1.544 | 1.544 |
| 1.0 < | f/f6 | < 4.0 | 2.72 | 2.87 | 2.80 | 2.35 | 2.47 | 2.38 | 2.16 |

The photographic lens according to the exemplary embodiments may be miniaturized and may embody bright lenses. Also, the photographic lens may be applied to a photographic apparatus using a large image sensor. The photographic lens may be applied to various photographic apparatuses such as digital cameras, interchangeable-lens cameras, video cameras, cameras for cellular phones, and cameras for small mobile terminals.

While the invention has been particularly shown and described with reference to exemplary embodiments thereof, it will be understood by those of ordinary skill in the art that various changes in form and details may be made therein without departing from the spirit and scope of the invention as defined by the following claims.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A photographic lens comprising:
   a first lens comprising a convex surface toward an object side and having a positive refractive power;
   a second lens comprising a concave surface toward an image side and having a negative refractive power;
   a third lens;
   a fourth lens comprising a convex surface toward the object side;
   a fifth lens comprising a convex surface toward the image side and having a positive refractive power; and
   a sixth lens comprising a concave aspherical shape with respect to an optical axis toward the image side and having a negative refractive power,
   wherein the first to sixth lenses are sequentially arranged from the object side to the image side, and
   wherein optical image stabilization (OIS) is performed by moving all first to sixth lenses.

2. The photographic lens of claim 1, wherein the photographic lens satisfies the following equations:

$1.6 < Yimg/BF < 3.1$; and $Yimg/\tan\theta > 6.0$ mm;

in which Yimg indicates a maximum image height in the image plane, BF indicates a length between an image-side surface of the sixth lens and the image plane, and $\tan\theta$ indicates a half field of view at the maximum image height.

3. The photographic lens of claim 1, wherein a stop is provided between the first lens and the second lens.

4. The photographic lens of claim 1, wherein the photographic lens satisfies the following equation:

$vd2 < 30$;

in which vd2 indicates an Abbe number of the second lens.

5. The photographic lens of claim 1, wherein the photographic lens satisfies the following equations:

$vd1 > 50$; and $vd5 > 50$;

in which vd1 indicates an Abbe number of the first lens, and vd5 indicates an Abbe number of the fifth lens.

6. The photographic lens of claim 1, wherein the photographic lens satisfies the following equation:

$1.58 < N2 < 1.68$;

in which N2 indicates a refractive index of the second lens with respect to d-line.

7. The photographic lens of claim 6, wherein the photographic lens satisfies the following equations:

$1.51 < N5 < 1.56$; and $1.51 < N6 < 1.56$;

in which N5 indicates a refractive index of the fifth lens with respect to the d-line, and N6 indicates a refractive index of the sixth lens with respect to the d-line.

8. The photographic lens of claim 7, wherein the photographic lens satisfies the following equations:

$0.7 < f/f1 < 1.5$; and $0.9 < TL/f < 2.0$;

in which f indicates a focal length of the photographic lens, f1 indicates a focal length of the first lens, and TL indicates a length between the first lens and an image plane.

9. The photographic lens of claim 8, wherein the photographic lens satisfies the following equation:

$0 < Dair34/D25 < 0.15$;

in which Dair34 indicates a distance between the third lens and the fourth lens, and D25 indicates a distance between the second lens and the fifth lens.

10. The photographic lens of claim 6, wherein the sixth lens satisfies the following equation:

$1.0 < |f/f6| < 4.0$;

in which f indicates a focal length of the photographic lens, and f6 indicates a focal length of the sixth lens.

11. The photographic lens of claim 1, wherein the sixth lens comprises one or more inflection points on an image-side.

12. The photographic lens of claim 1, wherein the first lens is formed of plastic or glass.

13. The photographic lens of claim 1, wherein the second to sixth lenses are formed of plastic.

14. The photographic lens of claim 1, wherein one of the first to sixth lenses is a negative lens having an Abbe number of 30 or less.

15. The photographic lens of claim 1, wherein the third lens and the fourth lens have smaller refractive powers than the first lens, the second lens, the fifth lens, and the sixth lens.

16. The photographic lens of claim 1, wherein the sixth lens comprises one or more inflection points on an object-side surface.

17. The photographic lens of claim 16, wherein the object-side surface of the sixth lens has a concave shape with respect to the optical axis.

18. The photographic lens of claim 16, wherein the photographic lens has an F number within a range of about 1.6 to about 1.8.

19. The photographic lens of claim 1, wherein both surfaces of the third lens are spherical.

20. The photographic lens of claim 1, wherein the first lens comprises a convex surface toward the image side.

21. A photographic apparatus comprising:
   a photographic lens comprising:
      a first lens comprising a convex surface toward an object side and having a positive refractive power;
      a second lens comprising a concave surface toward an image side and having a negative refractive power;
      a third lens;
      a fourth lens comprising a convex surface toward the object side;
      a fifth lens comprising a convex surface toward the image side and having a positive refractive power; and
      a sixth lens comprising a concave aspherical shape with respect to an optical axis toward the image side and having a negative refractive power,
   wherein the first to sixth lenses are sequentially arranged from the object side to the image side, and
   wherein optical image stabilization (OIS) is performed by moving all first to sixth lenses.

* * * * *